(12) United States Patent
Fisher

(10) Patent No.: US 9,208,466 B2
(45) Date of Patent: Dec. 8, 2015

(54) ELECTRONIC LOCK BOX SYSTEM WITH INCENTIVIZED FEEDBACK

(75) Inventor: Scott R. Fisher, West Chester, OH (US)

(73) Assignee: SentriLock, LLC, Cincinnati, OH (US)

( * ) Notice: Subject to any disclaimer, the term of this patent is extended or adjusted under 35 U.S.C. 154(b) by 1137 days.

(21) Appl. No.: 12/756,741

(22) Filed: Apr. 8, 2010

(65) Prior Publication Data

US 2011/0251876 A1    Oct. 13, 2011

(51) Int. Cl.
```
G06Q 10/00       (2012.01)
G06Q 30/00       (2012.01)
G06Q 10/08       (2012.01)
G06Q 30/02       (2012.01)
G07C 9/00        (2006.01)
```

(52) U.S. Cl.
CPC ............ *G06Q 10/08* (2013.01); *G06Q 30/0203* (2013.01); *G06Q 30/0216* (2013.01); *G06Q 30/0218* (2013.01); *G07C 9/00174* (2013.01)

(58) Field of Classification Search
CPC .............. G06Q 10/08; G06Q 30/0203; G06Q 30/0216; G06Q 30/0218; G07C 9/00174
USPC ......................................................... 705/7.32
See application file for complete search history.

(56) References Cited

U.S. PATENT DOCUMENTS

| | | | |
|---|---|---|---|
| 4,766,746 A * | 8/1988 | Henderson et al. | 340/5.73 |
| 5,046,084 A | 9/1991 | Barrett | |
| 5,280,518 A | 1/1994 | Danler | |
| 5,475,375 A | 12/1995 | Barrett | |
| 5,654,696 A | 8/1997 | Barrett | |
| 6,798,780 B1 * | 9/2004 | Dan et al. | 370/395.21 |
| 2002/0062248 A1 * | 5/2002 | Sakurai | 705/14 |
| 2003/0009373 A1 * | 1/2003 | Ensing et al. | 705/10 |
| 2004/0006542 A1 * | 1/2004 | Gilliam et al. | 705/51 |
| 2004/0219903 A1 | 11/2004 | Despain | |
| 2006/0106628 A1 | 5/2006 | Faherty | |
| 2007/0090921 A1 * | 4/2007 | Fisher | 340/5.73 |
| 2007/0226046 A1 | 9/2007 | Share | |
| 2008/0246587 A1 * | 10/2008 | Fisher | 340/5.73 |
| 2008/0281609 A1 | 11/2008 | Marino | |
| 2009/0030718 A1 * | 1/2009 | Bengson | 705/1 |
| 2009/0070178 A1 | 3/2009 | Gilbert | |
| 2009/0219133 A1 * | 9/2009 | Woodard et al. | 340/5.65 |

OTHER PUBLICATIONS

Showing Suite, Inc. Launches Broker Transparency Real Estate Software Package that Increases Showings and Sales Anonymous. PR Newswire [New York] Apr. 21, 2009.*
HomeFeedback.com (archived web page published Mar. 18, 2009 and retrieved on Feb. 24, 2013 from http://web.archive.org/web/20090318060055/http://homefeedback.com/?).*

* cited by examiner

*Primary Examiner* — Timothy Padot
(74) *Attorney, Agent, or Firm* — Frederick H. Gribbell

(57) ABSTRACT

An electronic lock box system that includes a central computer, which allows "listing agents" (if used in a real estate sales environment) to custom tailor a survey questionnaire that relates to features connected with the potential sale or lease of a property, and thereby garner feedback information from potential buyers (or lessees), or at least from "showing agents" that represent potential buyers/lessees. To improve response rate, the listing agent can add incentives to other agents who provide useful feedback. Furthermore, the system can be configured such that reciprocal feedback is necessary in order for a participating agent to see feedback about his or her own listings.

16 Claims, 11 Drawing Sheets

ELECTRONIC LOCK BOX SYSTEM WITH INCENTIVIZED FEEDBACK

CROSS-REFERENCE TO RELATED APPLICATIONS

None.

TECHNICAL FIELD

The technology disclosed herein relates generally to electronic lock equipment and is particularly directed to an electronic lock box of the type that contains a secure compartment for storing keys that allow entry to a structure or other objects. It is specifically disclosed as an electronic lock box system that includes inducements to real estate agents to provide feedback to listing agents on home showing activity.

The technology disclosed herein represents an improvement to the earlier designs by allowing listing agents to custom tailor a survey relating to features or aspects connected with the potential sale of a property, and thereby garner feedback from potential buyers. To improve response rate, the listing agent can add incentives to other agents who provide useful feedback. Further, the system can be configured such that reciprocal feedback is necessary in order for a participating agent to see feedback on his or her own listings.

BACKGROUND

In the real estate industry, there exists a significant amount of activity relating to the sale of a house that is decoupled from the listing agent's sphere of influence. A typical real estate association may contain more than 1,000 members thus agents showing a listing to a particular buyers may garner feedback from their clients that never makes its way back to the listing agent. The listing agent must often, at the client's behest, contact the showing agent to receive feedback. This can be a time consuming practice and can lead to home seller frustration in understanding what steps are necessary to quickly sell their home. Information technology today can automate these processes and some prior art utilized fax machines to send out showing reports. These previous solutions provide no detail of feedback from the potential home buyer and therefore don't provide much in the way of meaningful information.

In addition, many agents today are classified as buyer's agents where they themselves rarely if ever work for the home seller. These agent's have little inclination to provide general feedback on the subject property unless the potential buyer is seriously interested in pursuing purchase of the subject property. This leads to less effective management of the sale of the property.

Lastly, like any industry where cooperation/competition exist side by side, there exists a segment of the population that want to receive everything but in return give nothing. It is important to negate potential abuses of the system, so that a level playing field will exist between all parties in the transaction.

SUMMARY

Accordingly, it is an advantage to provide an electronic lock box system that provides incentives to garner feedback from "showing agents" so that "listing agents" receive useful information about properties that are being sold, and that are being "shown" to potential buyers.

It is another advantage to provide an electronic lock box system that provides a central computer with functions that can create survey questionnaires for properties that are available for sale, such that a listing agent can either create a customized questionnaire or a utilize a default questionnaire that the central computer will generate, and then present such questionnaires to a showing agent after the "showing" of a property to a potential buyer.

It is yet another advantage to provide an electronic lock box system with a central computer that includes a "bounty system" function so that a listing agent can determine if feedback from a showing agent was well-intentioned, and if so, to nominate this feedback to the central computer, which tracks the feedback for multiple showing agents in the system; and once a property is sold, the central computer distributes a pool of virtual money to the showing agent(s) that previously provided well-intentioned feedback that was nominated by the listing agent, and this virtual money can be made available to the showing agent(s) for other purposes.

It is still another advantage to provide an electronic lock box system with a central computer that includes a "mutual cooperation" function that tracks feedback requests that were received by the central computer, and also feedback generated and received by the central computer, per agent, and then tracks a ratio of the feedback received compared to the feedback generated, and compares this ratio to predetermined thresholds, and if a particular agent allows his or her ratio to fall below one of the thresholds, then the central computer can invoke certain punitive measures so that the agent will have a restricted use of the mutual cooperation electronic lock box system.

It is a further advantage to provide an electronic lock box system with a central computer that has a listing agent scoring function that allows a showing agent to contest a listing agent who has rejected feedback by the showing agent; and the central computer will track a score for each listing agent in the system, and if that agent's score falls below a predetermined threshold, the central computer may levy a penalty against the listing agent.

It is still a further advantage to provide an electronic lock box system with a central computer that has a listing agent evaluation function that tracks the feedback quality score of each listing agent-showing agent pair, and compares that feedback quality score to a system-wide mean value of all such feedback quality scores, and if the listing agent's feedback quality score (versus the particular showing agent) falls below a predetermined threshold, the central computer may levy a penalty against the listing agent.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, an electronic lock box system having an incentivized feedback function is provided, which comprises: a central computer system, having a first processing circuit, a first memory circuit, and a first communications circuit, wherein the first memory circuit includes a database that contains information about a plurality of properties; a plurality of electronic lock boxes associated with the plurality of properties, which are placed at locations physically remote from the central computer system, each of the plurality of electronic lock boxes having a second processing circuit, a second memory circuit, and a second communications circuit; and a plurality of user-controlled remote computer devices, each of the plurality of user-controlled remote computer devices having a third processing circuit, a third memory circuit, and a third communications circuit; wherein the central computer system, the plurality of electronic lock boxes, and the plurality of user-controlled remote computer devices are configured: (a) to establish a communications session between the central computer system and a first one of the user-controlled remote computer devices so that a first user may create a survey questionnaire that pertains to one of the plurality of properties; (b) to store the survey questionnaire for the one of the plurality of properties in the database; (c) after an authorized access by a second user of one of the plurality of electronic lock boxes associated with one of the plurality of properties, to establish a communications session between the central computer system and a second one of the user-controlled remote computer devices and to automatically send the survey questionnaire to the second user so that the second user may provide a feedback response to the survey questionnaire; and (d) to evaluate a performance of the second user, based upon the feedback response.

In accordance with another aspect, an electronic lock box system having an incentivized feedback function is provided, which comprises: a central computer system, having a first processing circuit, a first memory circuit, and a first communications circuit, wherein the first memory circuit includes a database that contains information about a plurality of properties; a plurality of electronic lock boxes associated with the plurality of properties, which are placed at locations physically remote from the central computer system, each of the plurality of electronic lock boxes having a second processing circuit, a second memory circuit, and a second communications circuit; and a plurality of user-controlled remote computer devices, each of the plurality of user-controlled remote computer devices having a third processing circuit, a third memory circuit, and a third communications circuit; wherein the central computer system, the plurality of electronic lock boxes, and the plurality of user-controlled remote computer devices are configured: (a) to store a plurality of survey questionnaires that pertain to the plurality of properties in the database, wherein the plurality of survey questionnaires are created by one of: (i) the central computer system; and (ii) a first user, by use of a first one of the plurality of user-controlled remote computer devices; (b) after an authorized access by a second user of one of the plurality of electronic lock boxes associated with one of the plurality of properties, to establish a communications session between the central computer system and a second one of the user-controlled remote computer devices and to automatically send the survey questionnaire to the second user so that the second user may provide a feedback response to the survey questionnaire; and (c) to establish a communications session between the central computer system and the first one of the user-controlled remote computer devices and to provide the feedback response to the first user, so that the first user may determine whether the feedback response was well-intentioned, and upon that determination, the first user may: (i) reject the feedback response, or (ii) nominate the feedback response to the central computer system.

In accordance with yet another aspect, an electronic lock box system having an incentivized feedback function is provided, which comprises: a central computer system, having a first processing circuit, a first memory circuit, and a first communications circuit, wherein the first memory circuit includes a database that contains information about a plurality of properties; a plurality of electronic lock boxes associated with the plurality of properties, which are placed at locations physically remote from the central computer system, each of the plurality of electronic lock boxes having a second processing circuit, a second memory circuit, and a second communications circuit; and a plurality of user-controlled remote computer devices, each of the plurality of user-controlled remote computer devices having a third processing circuit, a third memory circuit, and a third communications circuit; wherein the central computer system, the plurality of electronic lock boxes, and the plurality of user-controlled remote computer devices are configured: (a) to store a plurality of survey questionnaires that pertain to the plurality of properties in the database, wherein information contained in feedback responses to the plurality of survey questionnaires is beneficial to a first one of a plurality of authorized agents who are authorized to access at least one of plurality of electronic lock boxes that are registered with the central computer system; (b) after an authorized access of one of the plurality of electronic lock boxes associated with one of the plurality of properties, to establish a communications session between the central computer system and one of the user-controlled remote computer devices and to automatically send the survey questionnaire to a second one of the plurality of authorized agents so that the second one of the plurality of authorized agents may provide a feedback response to the survey questionnaire; and (c) after multiple authorized accesses of the plurality of electronic lock boxes associated with at least one of the plurality of properties, to calculate a ratio score of at least one participating agent of the plurality of authorized agents, wherein the score is based upon: (i) a number of feedback response requests received by the central computer system, which were sent by the at least one participating agent, and (ii) a number of feedback responses generated by the at least one participating agent to the central computer system; (d) to establish a first predetermined threshold value; and (e) to determine whether the ratio score of the at least one participating agent is below the first predetermined threshold value; and (i) if not, then to continue to allow normal agent activity; or (ii) if so, then to penalize the at least one participating agent.

In accordance with a further aspect, an incentivized feedback method for operating an electronic lock box system is provided, in which the method comprises the following steps: (a) providing: (i) a central computer system, having a database that contains information about a plurality of properties, (ii) a plurality of electronic lock boxes associated with the plurality of properties, which are placed at locations physically remote from the central computer system, and (iii) a plurality of user-controlled electronic keys; (b) based upon an interaction between one of the plurality of electronic lock boxes and one of the plurality of user-controlled electronic keys, generating a unique transaction identifier and sending the unique transaction identifier to the central computer system; (c) based upon receipt of the unique transaction identifier at the central computer system, sending an information request message to a corresponding user of the one of the plurality of user-controlled electronic keys; (d) based upon receipt of the information request by the user, sending a feedback response message to the central computer system, and storing in the database the feedback response message; and (e) based upon a plurality of the stored feedback response messages that were sent by the user, determining a response rate associated with the user, and storing in the database the response rate.

In accordance with a yet further aspect, an incentivized feedback method for operating an electronic lock box system is provided, in which the method comprises the following steps: (a) providing: (i) a central computer system, having a database that contains information about a plurality of properties, (ii) a plurality of electronic lock boxes associated with the plurality of properties, which are placed at locations physically remote from the central computer system, and (iii) a plurality of user-controlled electronic keys; (b) based upon an interaction between one of the plurality of electronic lock boxes and one of the plurality of user-controlled electronic keys, generating a unique transaction identifier and sending the unique transaction identifier to the central computer system; (c) based upon receipt of the unique transaction identifier at the central computer system, sending an information request message to a corresponding user of the one of the plurality of user-controlled electronic keys; (d) based upon receipt of the information request by the user, sending a feedback response message to the central computer system, and storing in the database the feedback response message; (e) determining a scoring value, based upon at least one criterion of the feedback response message; and (f) storing the scoring value in the database.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

DETAILED DESCRIPTION

Figure 1:
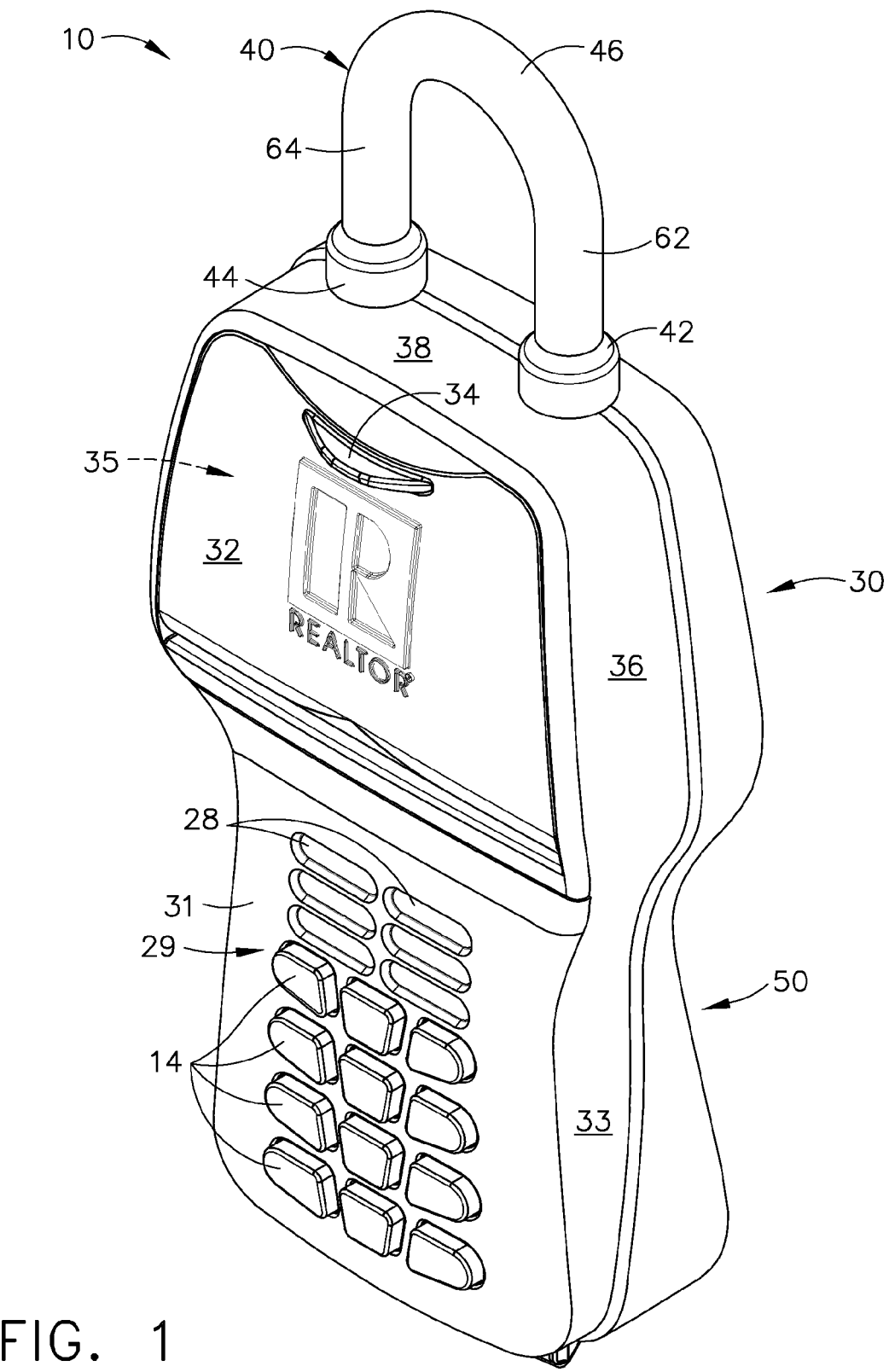
FIG. 1 is a perspective view from the front, right, and above of a first embodiment of an electronic lock box, as constructed according to the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In addition, it should be understood that embodiments disclosed herein include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the technology disclosed herein may be implemented in software. As such, it should be noted that a plurality of hardware and software-based devices, as well as a plurality of different structural components may be utilized to implement the technology disclosed herein.

It will be understood that the term "circuit" as used herein can represent an actual electronic circuit, such as an integrated circuit chip (or a portion thereof), or it can represent a function that is performed by a processing device, such as a microprocessor or an ASIC that includes a logic state machine or another form of processing element (including a sequential processing device). A specific type of circuit could be an analog circuit or a digital circuit of some type, although such a circuit possibly could be implemented in software by a logic state machine or a sequential processor. In other words, if a processing circuit is used to perform a desired function used in the technology disclosed herein (such as a demodulation function), then there might not be a specific "circuit" that could be called a "demodulation circuit;" however, there would be a demodulation "function" that is performed by the software. All of these possibilities are contemplated by the inventor, and are within the principles of the technology when discussing a "circuit."

Referring now to the drawings, FIG. 1 illustrates a first embodiment of an electronic lock box generally designated by the reference numeral 10, which is suitable for use with the technology disclosed herein. Lock box 10 has an outer housing, including a lower housing portion 50, and an upper housing portion 30, in which the lower housing includes a keypad 29 at a keypad area 31, and the upper housing includes a movable key compartment door 32. In the keypad area 31, there are multiple individual pushbutton keys 14, and also on the front surface of the keypad area 31, there is a set of indicator lamps 28 that act as an annunciator.

FIG. 1 illustrates the outer portions of lock box 10 in the operating mode in which the key compartment door 32 is closed. The upper housing of lock box 10 is illustrated at 38, and includes two receptacles (not shown) that receive a shackle 40. The shackle 40 has an upper portion 46 and two shackle extensions 64 and 62 that fit through the receptacles. The shackle also includes two "rain caps" at 42 and 44 of increased diameter, which also act as mounting stops. In FIG. 1 a key compartment door handle 34 can be seen, which assists a user in opening the key compartment door 32.

The lower housing portion 50 has a right side 33 and a left side (not seen in this view). The upper housing portion 30 exhibits a right side 36 and a left side (not seen in this view). An electrical connector (not shown) is positioned at the bottom of the lock box, and is designed to receive a portable memory card 70 (see FIG. 3) that may also contain a microcomputer chip. Such memory cards are sometimes referred herein to as "smart cards," and are interfaced to the lock box 10 at a smart card connector 17 (see FIG. 3). It will be understood that a future version of the lock box 10 could be constructed such that the smart card uses a different method (other than making electrical contact) to communicate to the electronics of the lock box; moreover, a future version of the lock box could be constructed in which an "electronic key" is used to communicate with the lock box, and no smart card at all would be used in such a system.

It will further be understood that the portable memory card 70 could be in the form of virtually any type of portable memory device, so long as it contains memory cells that are capable of storing the types of data that are needed for the electronic lock box system, such as encrypted numeric data, and/or other types of alphanumeric data that typically is stored as digital numbers for use with digital computers.

It will also be understood that an electronic key could be one of many different types of portable devices, so long as it is capable of communicating with the electronic lock box, and includes memory cells that again are capable of storing the types of data that are needed for the electronic lock box system; moreover, a typical electronic key will also be able to send certain authorization commands to an electronic lock box that the key is in communication with.

The various computer devices that can be interfaced to the central computer system 260 are sometimes referred to herein, as a group of such devices, as "user-controlled remote computer devices." These "user-controlled remote computer devices" explicitly include electronic keys, PDAs, Internet-capable cellular telephones, laptop computers and other types of portable memory computing devices, and also "regular" personal computers that are not truly "portable."

A secure compartment 35 is located behind the key compartment door 32. This secure compartment will also be referred to herein as the "key compartment," which is a volumetric space that can contain one or more mechanical keys (or other types of key) that typically are used to unlock doors to a building or other structure. The details of the mechanical structure of this type of lock box design are described in U.S. Pat. No. 7,086,258, which is incorporated by reference herein, in its entirety.

Figure 2:
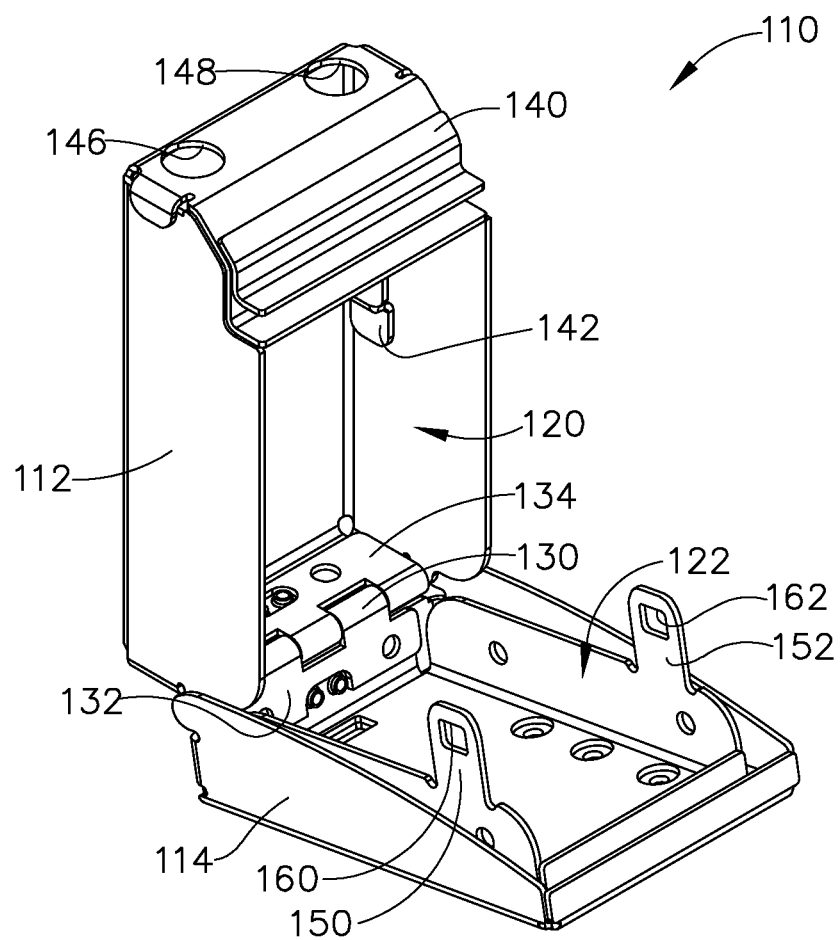
FIG. 2 is a perspective view from the front, left, and above of a central mechanical portion of a second embodiment of an electronic lock box, as constructed according to the principles of the technology disclosed herein.

Referring now to FIG. 2, an overall view of the outer casing of a second embodiment of an electronic lock box is illustrated, in which the lock box is generally designated by the reference numeral 110. The outer enclosure is hinged, and has a stationary rear case 112 and a movable (via the hinge) front case 114. There is an opening (not shown) in the front case for a keypad (similar to keypad 14 in FIG. 1), by which a user can enter commands and other information to the electronic controller of the electronic lock box 110.

FIG. 2 illustrates the electronic lock box 110 in the condition in which the front case 114 has been opened, and has been pivoted with respect to the rear case 112. A hinge pin 130 can be seen, as well as the front case hinge leaf 132, and the rear case hinge leaf 134. An open space or volume 120 is made available to hold the mechanical components that operate the latching and locking functions of the lock box 110, and this set of mechanical components is essentially to be affixed to the rear case 112. There is also an open space or volume 122 that is made available for holding a mechanical key, or other important component or device that is to be retained within the electronic lock box. This is also sometimes referred to as the "key compartment" or the "secure compartment," such as the key compartment 35 in FIG. 1. In FIG. 2, the secure compartment 122 is not illustrated in detail, as any type of relatively small container size and shape would suffice for holding a mechanical house key, or some other type of credit card-sized device that would hold building opening or access codes, for example.

FIG. 2 shows a pair of catching members 150 and 152, which are used to hold the front case 114 closed against the rear case 112. The first catching member 150 has an opening 160, and the second catching member 152 has an opening 162. These openings 160 and 162 will receive a spring-loaded movable member that, once in place within the openings 160 and 162, will prevent the key compartment 122 from being exposed (i.e., the key compartment "door" will remain closed).

FIG. 2 also illustrates openings for allowing a shackle to be inserted along the top surface of the electronic lock box 110. These shackle openings are at 146 and 148, and the "barrels" of the shackle are inserted here. The shackle itself is not illustrated in FIG. 2, for the sake of clarity. A cross brace 140 is illustrated, and its placement on the rear case 112 is depicted on FIG. 2. Also illustrated in FIG. 2 is one of the two side brackets 142 that are mounted into the rear case 112.

Figure 4:
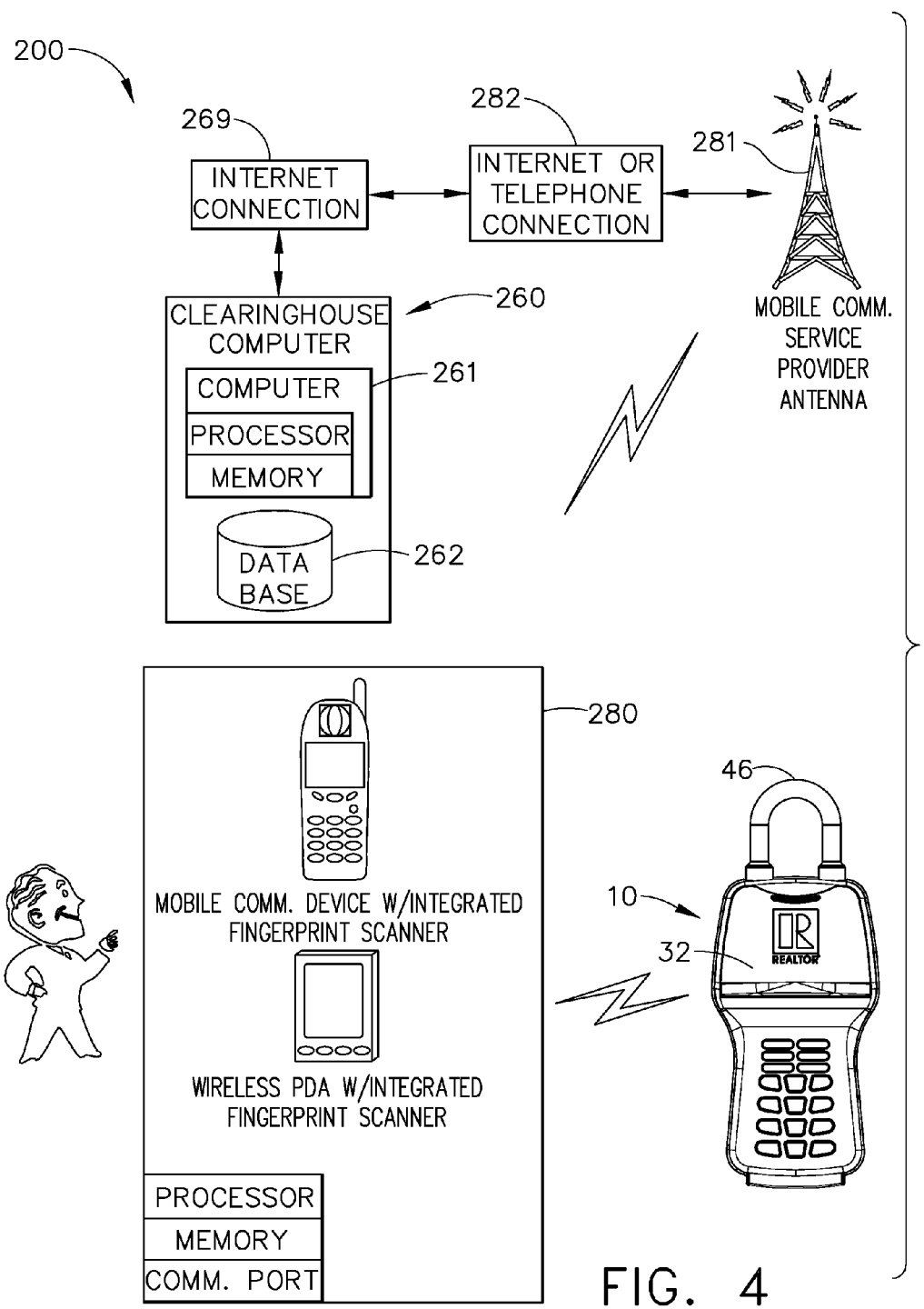
FIG. 4 is a diagrammatic view of the major components of a first embodiment electronic lock box security system, including a central computer station, a wireless communications device, and a portable electronic lock box apparatus such as that depicted in FIG. 1 or FIG. 2.

Referring now to FIG. 4, a first embodiment electronic lock box system, generally designated by the reference numeral 200, is depicted. The system 200 includes one or more electronic lock boxes 10, perhaps one or more secure memory cards (not shown on FIG. 4), portable computer devices 280, a central clearinghouse computer system 260 (also sometimes referred to herein as a "CCC"), and a wireless data communications system, represented by Internet® connections 269 and 282, and a mobile phone provider 281. The central clearinghouse computer 260 typically will include a database 262 which contains a repository of electronic lock box identification and attribute information, and also contains a repository of information about real estate agents. A computer 261 controls the database 262, and includes a processing circuit and a memory circuit (in addition to any bulk memory storage devices that contain the database 262).

The electronic lock box 10 typically is used to contain a door key to the dwelling (e.g., a house or condo). Electronic lock box 10 typically is attached to a fixed object (e.g., a door knob) on or proximal to the dwelling via an electronic lock box shackle 6. In some modes of operation, the secure memory card 70 is used by the individual (e.g., a real estate agent) desiring access to the dwelling or home as an identification mechanism, as well as a secure transport medium to exchange information with the portable computer device 280.

In general, electronic lock box access code information disclosed (e.g., displayed) by the portable computer device 280 is used by the user to gain access to the key compartment of the electronic lock box 10. The secure memory card 70 can also be used by a user to download access log data from the electronic lock box 10 (which has been stored in a memory device in the electronic lock box) for future processing by the user on an "office" computer (which could be virtually any type of PC-style personal computer or workstation). This office computer (not shown) would have an associated display monitor and keyboard, and typically would be placed in a REALTOR's office.

The portable computer device 280 includes the capability to interface to a cradle that holds a cable connector that is used to connect the portable computer 280 to the office computer through a serial data cable. A PC smart card reader is typically used in high traffic locations, such as offices where frequent updating of the secure memory card 70 is necessary or desirable. The office computer is used to communicate with a central clearinghouse computer system 260 via the Internet, or other network, to manage the information flow between the portable computer device 280, secure memory card 70, and in some instances through the PC smart card reader.

Figure 3:
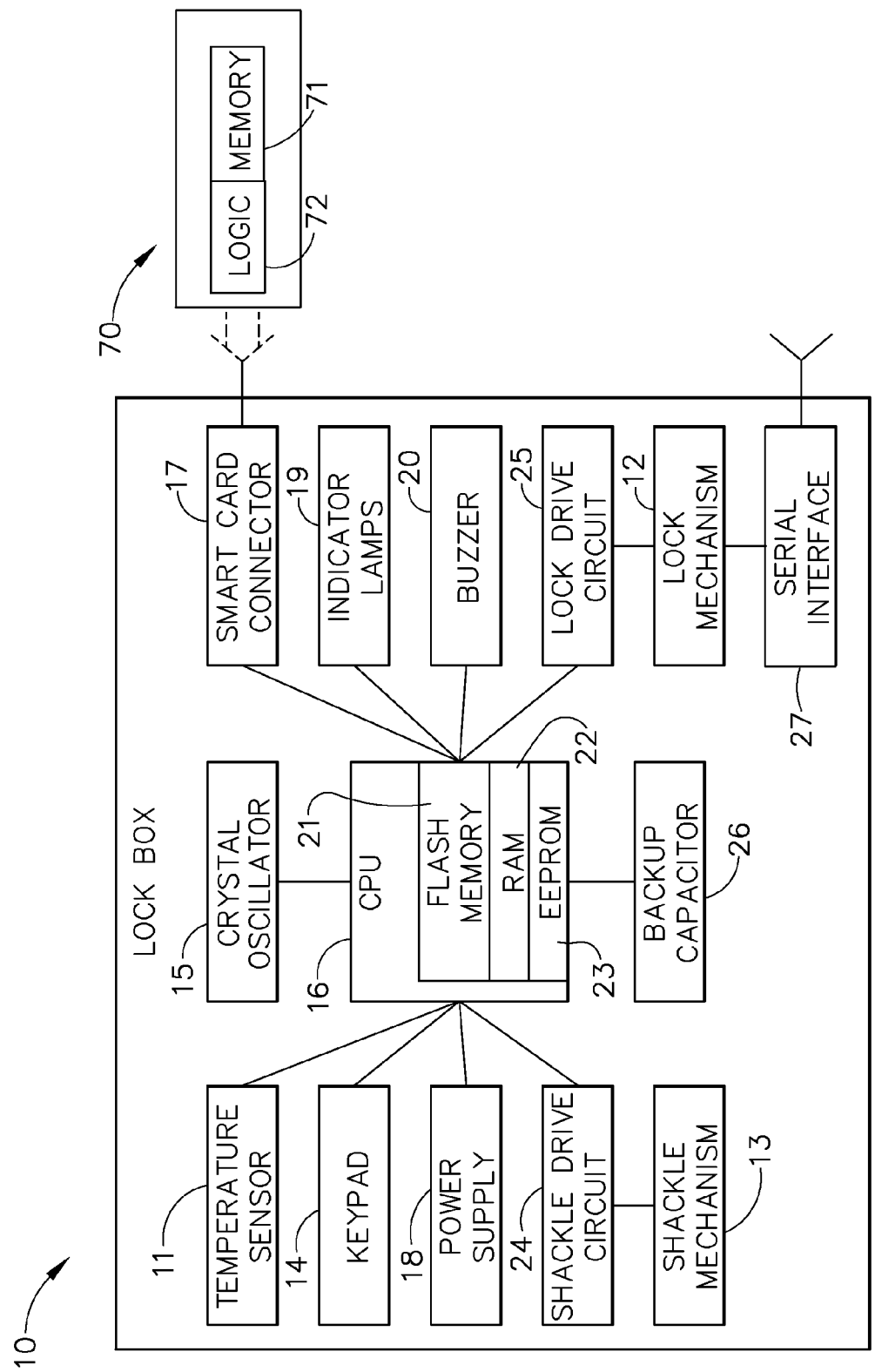
FIG. 3 is a schematic block diagram of the electrical components of an electronic lock box such as that depicted in FIG. 1 or FIG. 2.

The electronic circuitry of electronic lock box 10 is illustrated in block diagram form in FIG. 3. Electronic lock box 10 (or 110) includes a microprocessor (CPU) 16, FLASH memory 21, random access memory (RAM) 22, EEPROM (electrically erasable programmable read only memory) 23, a battery (or other electrical power supply) 18, a memory backup capacitor 26, an ISO-7816 smart card connector 17, indicator LED lamps 19, a piezo buzzer 20, a crystal oscillator 15, a digital temperature sensor 11 (these last two devices can be combined into a single chip), a shackle drive circuit 24, a shackle release mechanism 13, a key compartment mechanism drive circuit 25, a key compartment lock/release mechanism 12, and a membrane style keypad 14 for user data entry. A serial interface 27 is also included so that the CPU 16 is able to communicate with other external devices, such as a separate portable computer in the form of a PDA (personal digital assistant) or other type of portable computing device that uses a serial data link. For example, serial interface 27 can comprise in infrared (IR) port that communicates with a standard IR port found on many PDA's; or it could use a different communications protocol, such as BlueTooth.

Microprocessor 16 controls the operation of the electronic lock box 10 according to programmed instructions (electronic lock box control software) stored in a memory device, such as in FLASH memory 21. RAM memory 22 is typically used to store various data elements such as counters, software variables and other informational data. EEPROM memory 23 is typically used to store more permanent electronic lock box data such as serial number, configuration information, and other important data. It will be understood that many different types of microprocessors or microcontrollers could be used in the electronic lock box system 10, and that many different types of memory devices could be used to store data in both volatile and non-volatile form, without departing from the principles disclosed herein. In one mode of an exemplary embodiment, the electronic lock box CPU 16 is an 8-bit Atmel Mega8 microcontroller that incorporates RAM 22, FLASH memory 21 and EEPROM memory 23 internally (as on-board memory).

Battery 18 provides the operating electrical power for the electronic lock box. Capacitor 26 is used to provide temporary memory retention power during replacement of battery 18. It will be understood that an alternative electrical power supply could be used if desired, such as a solar panel with the memory backup capacitor.

Electronic lock box 10 includes a shackle 40 that is typically used to attach the box 10 to a door handle or other fixed object. Electronic lock box 10 also includes a key compartment 35 which typically holds a dwelling key (not shown), and which can be accessed via a key access door 32 (which is also referred to herein as a "controlled access member").

The key compartment lock and release mechanism 12 uses a gear motor mechanism (not shown) that is controlled by drive circuit 25 that in turn is controlled by CPU 16. Shackle release mechanism 13 also uses a gear motor, which is controlled by drive circuit 24 that in turn is controlled by CPU 16. It will be understood that the release or locking mechanisms used for the shackle 40 and key compartment 32 can be constructed of many different types of mechanical or electromechanical devices without departing from the principles disclosed herein.

The crystal oscillator 15 provides a steady or near-constant frequency (e.g., at 32.768 kHz) clock signal to CPU 16's asynchronous timer logic circuit. The ISO-7816 smart card connector 17 connects to electrical contacts on smart card 70 to allow the exchange of data between the electronic lock box's CPU 26 and the memory devices 71 in the smart card 70 (discussed below in greater detail). The smart card 70 itself typically will include some control logic circuits 72, to prevent "easy" or unauthorized access to the memory elements 71 on-board the card 70.

It should be noted that an electronic key (such as that described above) could be used as a type of secure memory device for the element at reference numeral 70, rather that a classic "smart card." Such an electronic key would also contain memory elements 71, and perhaps would contain some control logic circuits 72, although the control logic circuits might be optional, depending on the type of electronic key device that is used. With regard to FIG. 3, if an electronic key is used, it could be interfaced to the CPU circuit 16 of the electronic lock box 10 is many different ways, including via an electrical circuit that makes contact between the lock box 10 and the electronic key 70 (similar to that depicted on FIG. 3), or perhaps via an electromagnetic signal such as a short range radio wave, or an optical signal. As used herein, the term "electronic key" can have a meaning to include a relatively simple device, such as a secure memory card (or a "smart card"), and it can have a meaning to include a sophisticated device, such as a laptop computer that has a wireless communications circuit to send and receive messages from other devices, including an electronic lock box and/or a central clearinghouse computer. A "typical" electronic key will generally be a more sophisticated device.

In one embodiment, the digital temperature sensor 11 is read at regular intervals by the electronic lock box CPU 16 to determine the ambient temperature. Crystal oscillator 15 may exhibit a small change in oscillating characteristics as its ambient temperature changes. In one type of crystal oscillator device, the oscillation frequency drift follows a known parabolic curve around a 25 degrees C. center. The temperature measurements are used by CPU 16 in calculating the drift of crystal 15 and thus compensating for the drift and allowing precise timing measurement regardless of electronic lock box operating environment temperature. As noted above, a single chip can be used to replace the combination of crystal oscillator 15 and temperature sensor 11, such as a part number DS32KHZ manufactured by Dallas Semiconductor.

LED indicator lamps 19 and a piezo buzzer 20 are included to provide both an audible and a visual feedback of operational status of the electronic lock box 10. Their specific uses are described in detail in other patent documents by the same inventor, as noted below.

Backup capacitor 26 is charged by battery 18 (or perhaps by another power source) during normal operation. Capacitor 26 serves two functions, the first of which is to maintain adequate voltage to CPU 16 during either shackle drive circuit activation, or lock drive circuit activation. In an exemplary embodiment, capacitor 26 is charged from the regulated side of voltage regulator in power supply 18, whereas all electromechanical drive current is derived from the unregulated side of power supply 18. Capacitor 26 also maintains a stable voltage to CPU 16 during periods of high current drain on power supply 18. The second function of capacitor 26 is to maintain CPU 16 operation and RAM memory 22 during a period when the battery 18 is replaced.

Figure 5:
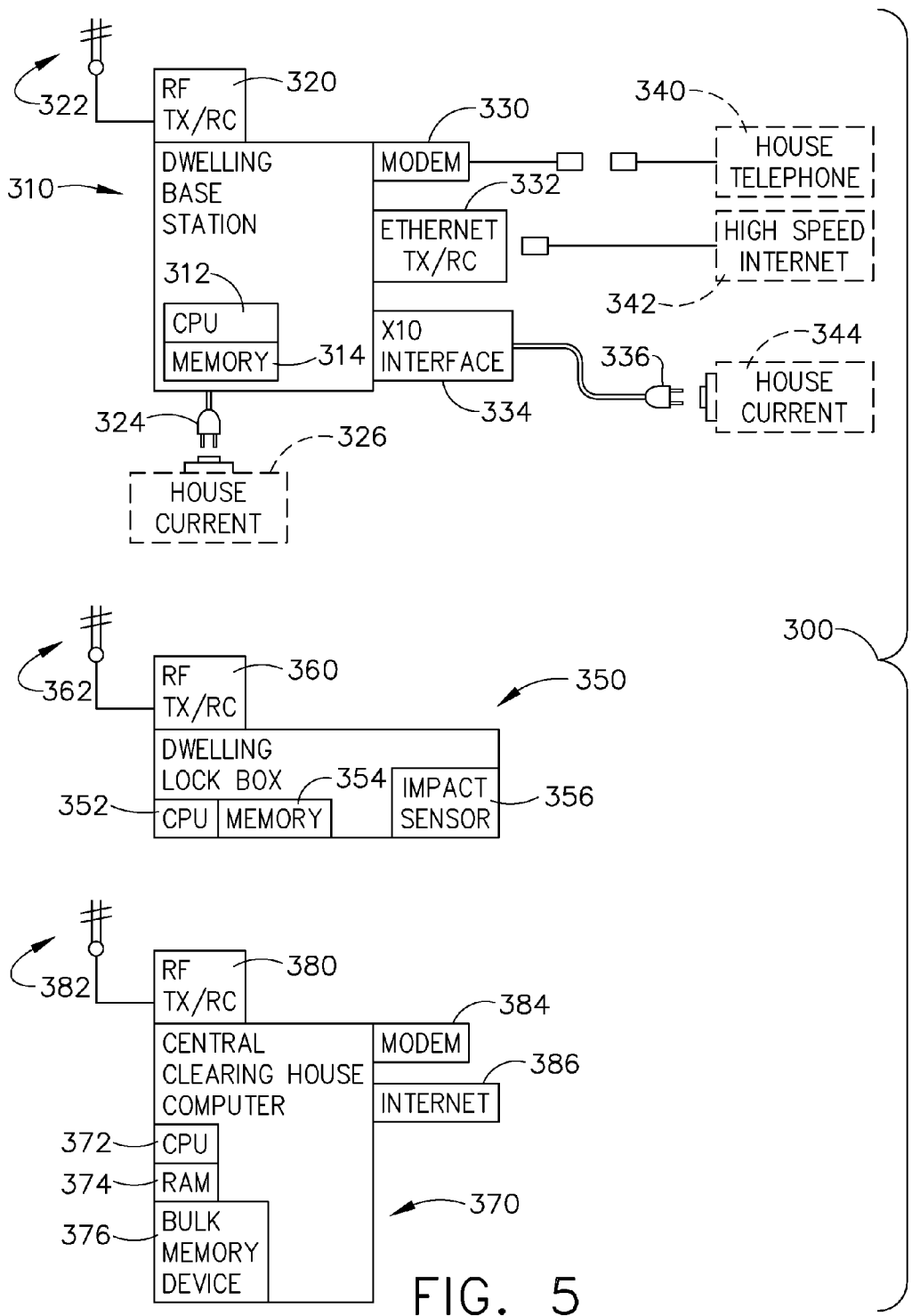
FIG. 5 is a diagrammatic view in block diagram form of an electronic lock box system that includes a transponder at a dwelling base station (typically within a dwelling structure) to relay lock box status or access event information over a short range radio from a lock box apparatus (such as that depicted in FIG. 1 or 2) first to the transponder, and then from the transponder to a remote central computer.

Referring now to FIG. 5, an alternative embodiment lock box security system is depicted, and is generally designated by the reference numeral 300. System 300 includes a dwelling electronic lock box that is generally designated by the reference numeral 350, while a dwelling base station is generally designated by the reference numeral 310. As described above, the electronic lock box 350 and the base station 310 can communicate with one another using a low-power radio frequency communications link, and each device would have a small radio antenna. At the lock box 350 there is a radio frequency transmitter/receiver 360 that is connected to an antenna 362. At the base station 310, there is a radio frequency transmitter/receiver 320 that is connected to an antenna 322.

Lock box 350 will typically have some type of controller unit such as a microprocessor or microcontroller, generally designated by the reference numeral 352. Lock box 350 will also include memory elements used as a memory circuit 354, which can include both Random Access Memory (RAM) and Read Only Memory (ROM). Additional memory elements of memory circuit 354 will likely include non-volatile but changeable memory, such as EEPROM devices or NVRAM devices.

The lock box 350 may also include an impact sensor 356, which can be used to notify the base station 310 in case of an attempted removal or other type of damage being done to the lock box 350, including intentional damage.

Base station 310 will typically include some type of controller unit 312, such as a microprocessor or microcontroller. Base station 310 would also typically control a memory circuit 314, which probably will include both RAM and ROM elements, and also perhaps some non-volatile but changeable memory, such as EEPROM or NVRAM devices.

While most lock boxes are placed external to a building such as a dwelling, the base station 310 is typically to be installed within a building so that it can have access to an electrical power source, and wide area communications resources such as a telephone line or broadband Internet connection. For that purpose, an outlet for house current 336 is provided, and the base station 310 would then include a power cord with a socket at 324. This allows the base station to not only have potential access to other types of communications devices that will be described below, but also allows the base station 310 to be equipped with a radio frequency transceiver where the receiving elements can be left in the energized state continuously, if desired (as compared to using batteries, or some other type of power source that would be depleted).

Base station 310 is designed to have at least one type of communications device that would typically be found within a dwelling. For example, base station 310 could include a modem 330 that can plug into a standard house telephone circuit 340. Alternatively or additionally, base station 310 can have an Ethernet transmitter/receiver circuit 332 that is capable of communicating over a high speed Internet circuit 342 that is found in many homes (including fiber optic links) As a further alternative, base station 310 may have an X10 interface 334 that allows it to send communication messages through the 120 Volt AC house current circuit of most homes in the United States. The X10 interface 334 will typically have some type of plug 336 that can be physically installed in a socket for the house current 344 of a typical dwelling. This will allow the base station 310 to send messages to other X10 type devices within the same dwelling that are also plugged into the house current.

Another component of FIG. 5 is a central clearinghouse computer, generally designated by the reference numeral 370. This central clearinghouse computer (also sometimes referred to herein as a "CCC") can have many functions, and some of these functions have been described in other patent documents by the same inventor, including those patent applications and issued patents noted herein. The central clearinghouse computer may contain the information for one or more real estate associations. Note that all embodiments of the technology disclosed herein will include some type of central clearinghouse computer.

The central clearinghouse computer 370 would typically include a central processing unit 372, Random Access Memory (RAM) 374 as well as some type of operating software stored in nonvolatile memory, such as ROM or on a hard disk drive. In addition to the above, the clearinghouse computer 370 would typically include a bulk memory storage device 376, such as a large amount of hard disk drives or optical memory, for example. Bulk memory device 376 for most clearinghouse computers would typically contain a database of home listings, which would probably be cross-correlated to real estate listing agents and selling agents, and other attributes concerning homeowners, both buyers and sellers. This database would typically be stored in the bulk memory device 376, although it could also be stored off-site if desired, and perhaps connected through an Internet link or other type of secure data link.

When used in a lock box system, central clearinghouse computer 370 would typically include a radio frequency transmitter/receiver device 380, which would be connected to an antenna 382. This would allow the clearinghouse computer to directly communicate with one or more of the base stations 310 that are found in dwellings. Another possibility is that the transmitter/receiver 380 of the clearinghouse computer 370 could possibly communicate directly with a dwelling lock box 350, via its transmitter/receiver 360 and antenna 362. This alternative use of a radio link may be less desirable in many ways than communicating with the base station 310, particularly since the lock box typically is battery powered.

Central clearinghouse computer 370 will also include other methods of communications and, for example, a modem 384/ and or an Internet link 386 could be installed in the clearinghouse computer system. On FIG. 5, the dwelling base station 310 has a modem 330 that could communicate with the modem 384 of the central clearinghouse computer 370. Moreover, an Internet link 342 could be established between an Ethernet interface 332 of the dwelling base station 310 and the Internet interface 386 of the central clearinghouse computer 370.

The embodiment depicted in FIG. 5 is an improvement to earlier lock box system designs, allowing a greater level of security and functionality by providing communications with a central computer, without the need for impractical long range radio communication circuitry in the lock box itself. A radio communication message is first sent to a local radio receiver (e.g., the transponder 320 in the dwelling base station 310), and the communication message is further relayed to central clearinghouse computer 370 via a variety of inexpensive and convenient methods such as dial-up modem, WiFi, or Bluetooth. Information to be exchanged between the central computer and the lock box can include such information as showing activity, security data (such as vandalism attempts), lock box theft, lock box configuration information, battery state, showing completion, and showing feedback. Through the use of inexpensive short range radios, power consumption is reduced, communication reliability is increased, and usefulness of the lock box system is significantly enhanced.

In the systems of the technology disclosed herein, the real estate agents that are authorized to access electronic lock boxes associated with a particular central computer system (also sometimes referred herein to as a "CCC") should have some type of computer access to that CCC. This could be accomplished by the real estate agent personally visiting the "home office" of the real estate association that administers the CCC for that real estate board/association, and linking to the CCC from that location; or it could be accomplished by the real estate agent communicating with the CCC from a remote location, with some type of personal computer or other type of intelligent communications device. In the system depicted on FIG. 4, an exemplary remote communications device was described as a "mobile communications device" 280, which could be a laptop computer, or a wireless Internet device (such as a PDA, for example), or a myriad of other types of communications equipment available today (or later to become available in the future). In the system depicted in FIG. 5, the emphasis was on a dwelling base station to remotely communicate with the CCC; however, it will be understood that the real estate agent using the system 300 (of FIG. 5) will also have his or her own separate communications link(s) available to him/her, which could be accomplished by using the very same types of mobile communications devices that were described in reference to FIG. 4. Moreover, a non-mobile personal computer also may be used to communicate with the CCC, typically over an Internet link, for any of the systems described herein.

Real estate agents today utilize several centralized computer systems for maintaining their business activities. The purpose of these systems is to provide timely market information relating to properties for sale in the area as well as administer lockbox access for property showings. Traditionally, one of the most important functions as a listing agent is to assist the home seller with properly pricing the property and getting the property sold in a reasonable period of time. As every home is different and the needs and desires of home buyers are quite diverse, it is very important to the listing agent to receive feedback from potential home buyers so that recommendations can be made to the home seller on improving the marketability of the home.

In the technology disclosed herein, the listing agent can create a customized survey for a listing in the central computer that administers the lockbox system. During a showing, the showing agent's smart card or electronic key is flagged with the serial number of the lock box visited. These electronic keys are set to expire at regular intervals so that agents must initiate communication between the electronic key and the central computer system such that information can be exchanged with the electronic key, thereby causing it to be refreshed or renewed for an additional time period, as well as allowing the central computer to retrieve the showing access log information from the electronic key. This process is well documented in earlier U.S. patents.

Survey Questionnaire System

Upon retrieving the access log, the central computer software looks up the listing information and determines if a survey questionnaire has been created by the listing agent for the property. This questionnaire could be a "default" questionnaire sent if no custom one was created, or it could be a specially customized questionnaire created by the listing agent; alternatively, it could be created by the central computer software in response to certain features known about the property. The questionnaire is then sent to the showing agent via any number of possible communication methods, such as e-mail, text message, web page, or interactive voice response system (IVR). The types of questions found in such surveys/questionnaires usually center around features of the property, such as, "What did you like most about the property?" or "Did you find the selling price to be commensurate with your opinion of the property?" Prior to this system, the received questionnaire had a high probability of being ignored by the showing agent, as there was little to no incentive to spend the time to craft a meaningful response.

Figure 6:
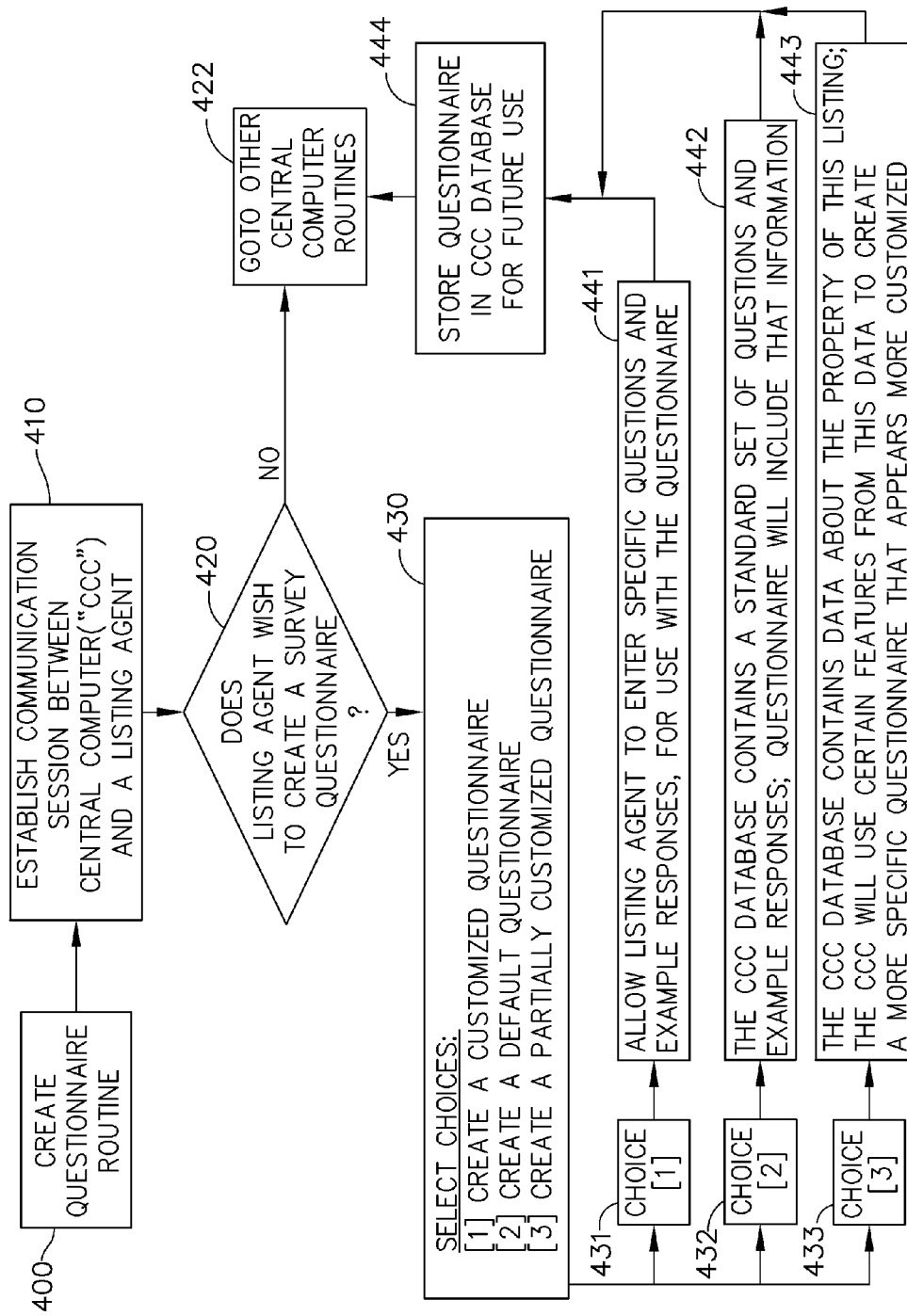
FIG. 6 is a flow chart of the steps performed by a "Create Questionnaire Routine," as used by the central computer station of an electronic lock box security system.

Referring now to FIG. 6, a flow chart is provided that describes part of the questionnaire system used for the technology disclosed herein. Starting at a step 400, which begins the "Create Questionnaire Routine," the logic flow is directed to a step 410 that establishes a communication session between the central computer system (also sometimes referred to herein as the "Central Clearinghouse Computer" or "CCC") and a "listing agent." This communication session can comprise various forms of telecommunications that are available today, or perhaps a new form of communications that has yet to be invented.

Once the communication session has been established between the CCC and the listing agent, a decision step 420 determines whether the listing agent wishes to create a survey questionnaire. If the answer is NO, then the logic flow is directed to a step 422, at which time the CCC will execute other computer routines that it performs. On the other hand, if the answer is YES at decision step 420, then the logic flow is directed to a step 430.

At step 430, the listing agent is presented with a selection of various choices. In an exemplary system, there can be at least three such choices, including: [1] creating a customized questionnaire; [2] creating a default questionnaire; or [3] creating a partially customized questionnaire Depending upon the listing agent's selection, the logic flow will appropriately continue on FIG. 6.

If choice [1] has been selected, then a step 431 is indicated, and the logic flow is directed to a step 441, which allows the listing agent to enter specific questions and example responses that are to be used with the questionnaire. These questions will later be presented to a "showing agent" who is showing the property to a potential customer, and that showing agent will be able to respond to those questions by using the exemplary responses that have been entered by the listing agent in this step 441. After the listing agent has finished creating the customized questionnaire at step 441, the logic flow is directed to a step 444 at which time the questionnaire is then stored in the CCC database, for future use in an actual showing in the electronic lock box system for this particular property.

If choice [2] was selected, then a step 432 is indicated, which then directs the logic flow to a step 442. The CCC database contains a standard set of questions and exemplary responses. At step 442, the listing agent has not created any type of questionnaire, and a "default questionnaire" that includes the standard set of questions and responses will then be used instead of a custom questionnaire. The logic flow is then directed to step 444, at which time this default questionnaire will be stored in the CCC database for future use with this particular property.

If choice [3] has been selected by the listing agent, then a step 433 is indicated, which will direct the logic flow to a step 443. In step 443, the CCC database will use certain features from this particular property to create a more specific questionnaire that appears to be at least somewhat customized. This can occur because the CCC database contains certain types of information about all properties that have been "listed" in this CCC system, including the property for this particular listing, and that information can be inspected, and certain features from that information can be gleaned to create a more specific questionnaire.

Once this questionnaire has been formed, the logic flow is directed to step 444, where this questionnaire is then stored in the CCC database for future use for that particular property. The logic flow is now directed to step 422, at which time the CCC will execute other central computer routines, as noted above after a NO response from decision step 420.

Figure 7:
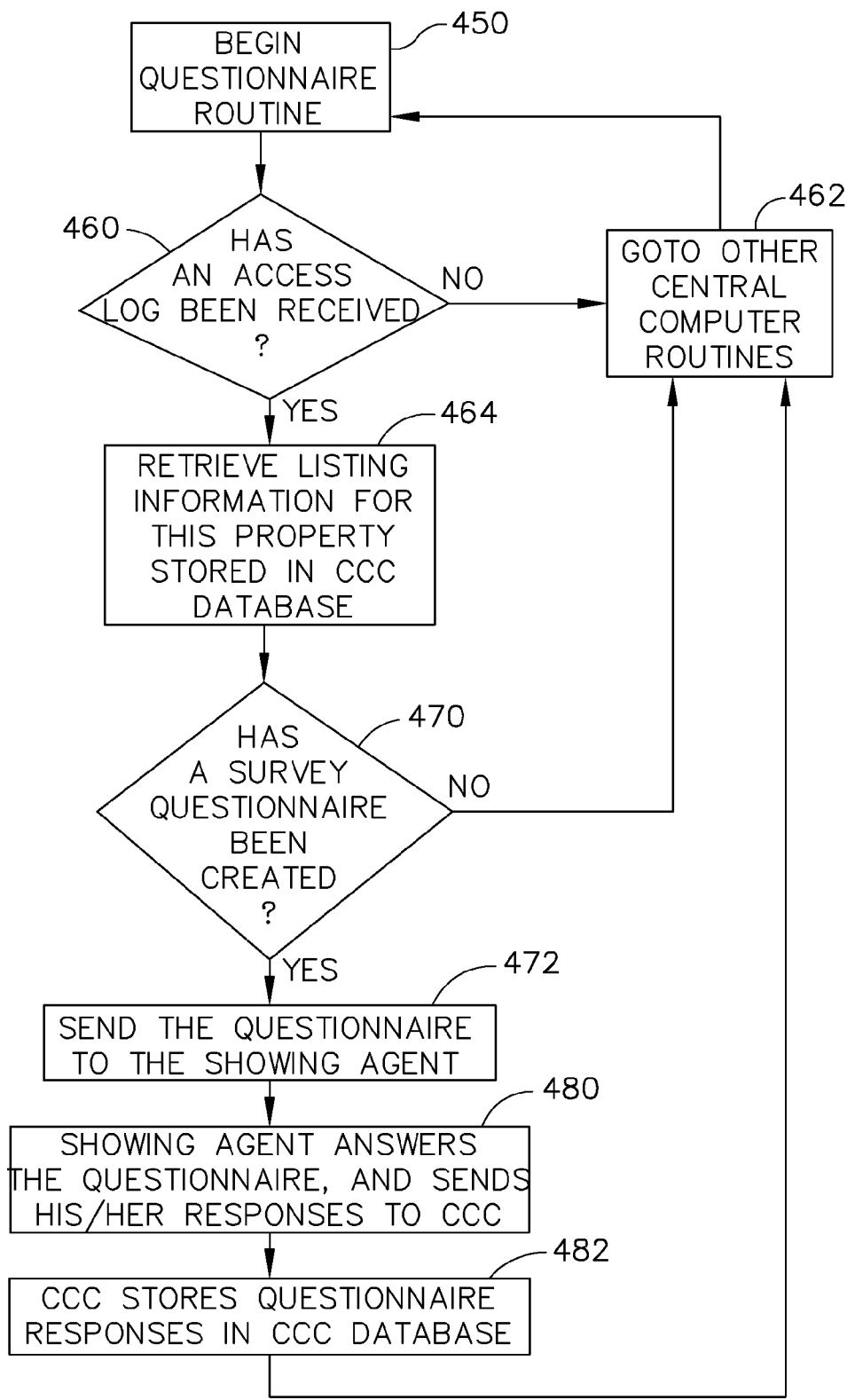
FIG. 7 is a flow chart of the steps performed by a "Begin Questionnaire Routine," as used by the central computer station of an electronic lock box security system.

Referring now to FIG. 7, a "Begin Questionnaire Routine" occurs at a step 450. This routine is executed only after a questionnaire has been created in the first place, as per the flow chart of FIG. 6, for a particular property. Although that questionnaire might be a "default questionnaire," there nevertheless must be some type of questionnaire stored in the CCC database for a particular property before any type of questionnaire is utilized at all. (Alternatively, the CCC system can be programmed to always include a default questionnaire for every property listing, without any action by the listing agent.)

The logic flow is directed from step 450 to a decision step 460, which determines whether or not an access log has been received for one of the lock boxes in the system that is affiliated with a particular CCC. If the answer is NO, then the logic flow is directed to a step 462, at which time the CCC executes other central computer routines.

If the answer is YES at decision step 460, then the logic flow is directed to a step 464, and the CCC retrieves the listing information for this property that has been stored in the CCC database. A decision step 470 now determines whether or not a survey questionnaire has been created for this property. If the answer is NO, then the logic flow is directed to step 462, at which time the CCC goes on to executing other central computer routines.

If the answer is YES at decision step 470, then the logic flow is directed to a step 472 which then sends the questionnaire to the showing agent. (Again, the CCC could be programmed to always provide at least a "default questionnaire" at steps 470 and 472.)

The questionnaire can be "sent" to the showing agent at step 472 by many various communications methods, including standard telecommunications methods that are available in today's technology. Of course, future types of communications techniques that have yet to be invented can later be used for this type of function, without departing from the principles of the technology disclosed herein. Once the showing agent has received the questionnaire, then that showing agent can answer the questions posed by the questionnaire, typically using the example responses that are already included in the survey questionnaire for that property. The showing agent can later upload his or her survey questionnaire answers/responses to the CCC, at an appropriate time, at step 480 on FIG. 7. When the CCC receives the questionnaire responses, those responses are stored in the CCC database, at a step 482. The logic flow is then directed to step 462, and the CCC executes other central computer routines.

Two primary methods are now described below, for use to elicit feedback on property showings performed by real estate agents. These two methods can be used independently or they can be combined. The first such method is referred herein as the "Bounty System."

Bounty System; General Description

The Bounty System allows a listing agent in a centralized computer system, such as those used in conjunction with electronic lock boxes, to assign a monetary reward to showing agents that respond to a survey feedback request. For example, the listing agent may offer a pool of $20 to be shared by showing agents that provide useful feedback. Each time a listing agent receives feedback, that agent can decide whether the feedback is well intentioned, and the listing agent will then nominate or reject the feedback, using the central computer system. The central computer system database tracks the listing agent's response.

When the subject listing changes status from "on the market" to a "sold" condition in the database, the software in the central computer system then distributes the pool of dollars offered up by the listing agent to those agents who provided meaningful feedback. The central computer system maintains account information for each participating agent, and "virtual" money in these accounts can be reused by the future "showing agents" for their own future listings.

Money can be deposited into an account via such various electronic services, such PayPal®, and bounty money received in the system can ultimately be converted back to traditional currency via the same type of service.

To prevent abuses in the system, software metrics can be established to prevent wholesale rejection of all feedback by a listing agent. Part of the system includes a type of dispute action that can be taken by a showing agent, should a listing agent unfairly reject feedback received. A scoring system is used to track each listing agent and if the agent's score indicates activity that is unprofessional, penalties can be levied. Alternatively, an accumulated (or composite) "feedback quality score" can be tracked for each of the listing agents versus each of the showing agents, and this feedback quality score can be compared to the mean of all such feedback quality scores system-wide, and if there is an instance where the feedback quality score falls below a configurable threshold, then penalties can be levied. In this alternative evaluation routine, the tracking and penalties can be automatic, and the showing agent need not enter a dispute action to have the penalty imposed.

Bounty System; Detailed Description

Figure 8:
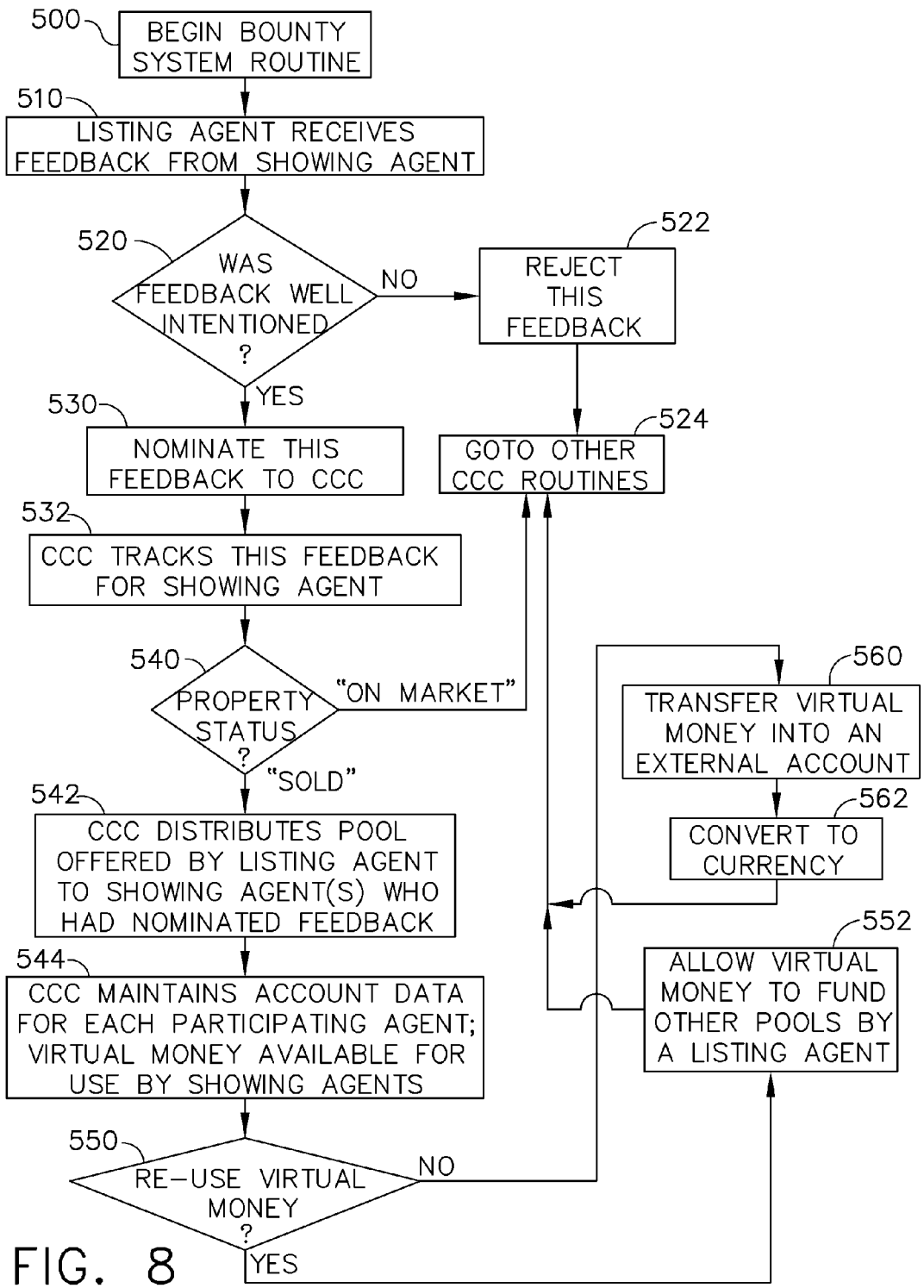
FIG. 8 is a flow chart of the steps performed by a "Bounty System Routine," as used by the central computer station of an electronic lock box security system.

Referring now to FIG. 8, a "Bounty System Routine" is illustrated in flow chart form. This routine begins at a step 500, and the first executable is a step 510 at which the listing agent receives feedback from a showing agent. This feedback is the set of survey questionnaire responses that the showing agent sent to the CCC at step 480 on the flow chart of FIG. 7.

After the listing agent receives feedback at step 510, a decision step 520 asks the showing agent whether or not the feedback was "well intentioned" feedback. If the answer is NO, then the logic flow is directed to a step 522, and this particular feedback is rejected by the showing agent. The CCC then executes other CCC routines at a step 524.

On the other hand, if the showing agent determines that the feedback was well intentioned, then the result would be YES at decision step 520, and this feedback is "nominated" to the CCC at a step 530. The CCC then tracks this feedback for the showing agent at a step 532.

A decision step 540 now determines the current status of the property for that particular listing. If a property is still for sale (also referred to as "ON MARKET"), then the logic flow is directed to step 524, and the CCC then executes other routines. However, if the property status is "SOLD," then the logic flow is directed to a step 542.

It will be understood that properties that are "for sale" in this system might actually be available for lease, rather than available to be outright purchased, and the principles of the incentivized feedback system described herein will directly apply to those situations. Furthermore, electronic lock box systems can also be used in systems that are not involved with real estate sales at all; for example, a "home" medical inspection system could use remotely-installed electronic lock boxes to allow authorized medical personnel to visit persons who live at various locations and in various situations, and the type of "incentivized feedback" that might be valuable in that type of system could refer to patient information relating to a recent visit of a particular patient by a doctor, nurse, or paramedic, for example.

In the above medical inspection system scenario, the attributes about a "property" would more likely refer to medical conditions or living conditions about a human being; however, the principles are still the same—there would be incentives provided to "person A" to send feedback to the central computer system so that "person B" could receive that feedback, and act more intelligently with respect to treating a patient that person A had visited. In this medical inspection system scenario, person A would be equivalent to a "showing agent" and person B would be equivalent to a "listing agent."

At step 542 the CCC distributes the pool assets that were offered by the listing agent, and this distribution is directed to the showing agent or agents who had been credited with "nominated feedback." In other words, the pool assets are distributed to the various showing agents who had earlier sent "well intentioned feedback" to the CCC, which was determined at steps 510, 520, and 530. A step 544 is executed so the CCC will maintain account data for each participating agent, and virtual money can be made available for use by the showing agent(s), if desired.

A decision step 550 now determines whether or not the virtual money will be re-used. If the answer is NO, then the logic flow is directed to a step 560, at which time the virtual money is transferred into an external account. A step 562, can then convert the virtual money to currency for the appropriate showing agent(s).

If the answer is YES at decision step 550, then a step 552 allows the virtual money to fund other pools for future use by a listing agent. In this manner, an agent who first was a showing agent can then become a listing agent, and have virtual money that is already in the CCC accounting system to fund that agent's own questionnaires and feedback distribution pool assets. Once the functions have been performed at steps 552 and 562, the logic flow is directed to step 524, at which time the CCC executes other CCC routines.

Mutual Cooperation System; General Description

In this aspect of the technology system disclosed herein, the "rewards" for participating are built around a scoring system that tracks how cooperative various agents are, in terms of responses generated to feedback that was requested. The purpose of the scoring system is to ensure that agents cannot simply be "information consumers;" instead, they must also participate in providing feedback when requested, otherwise their ability to request and receive feedback for their own listings will be curtailed. In one mode of this system, a scoring system is used that tracks feedback requests received as compared to feedback generated. If the ratio of feedback requests received to feedback generated falls below a predetermined first threshold value, the agent can no longer see responses to feedback requests he/she has initiated. Upon crossing a second threshold value, the initiating agent can no longer request feedback of other agents. These restrictions remain in place until the agent in question begins to participate in a professional manner. As the agent "redeems" himself or herself, the central computer system can automatically remove the restrictions that were previously placed on that agent.

Again, as in the Bounty System, a method will exist for a listing agent to nominate feedback received as being well intentioned; this evaluates the activities of showing agents. Also, a method will exist to evaluate the activities of listing agents, to prevent system abuse, as discussed below.

Mutual Cooperation System; Detailed Description

Figure 9:
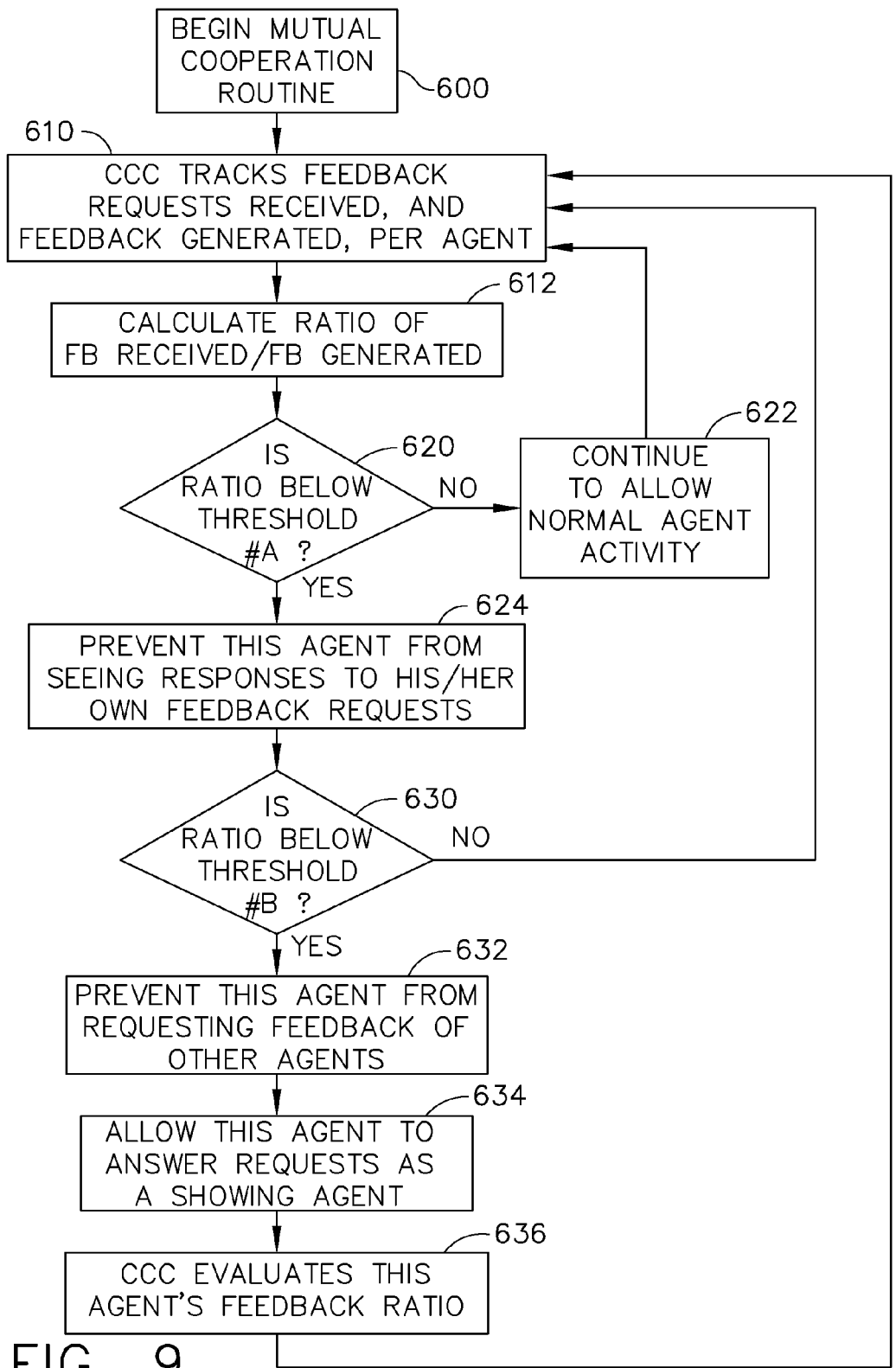
FIG. 9 is a flow chart of the steps performed by a "Mutual Cooperation Routine," as used by the central computer station of an electronic lock box security system.

Referring now to FIG. 9, a flow chart is provided for a "Mutual Cooperation Routine," which begins at a step 600. A step 610 provides functions so that the CCC tracks feedback requests that have been received, and also tracks feedback that has been generated, per agent in the CCC system. In general, a "feedback request" message (also sometimes called an "information request message" herein) is sent by the CCC after a showing has occurred—this showing can be thought of as a "transaction" between an electronic lock box (e.g., 10 or 110) and an electronic key (e.g., 70 or 280). The feedback request message is sent from the CCC to the agent (or "user") who performed the showing at the lock box's remote property location, using his/her electronic key. In general, a "feedback generated" message (also sometimes called a "feedback response message" herein) occurs after the earlier feedback request message was received by the agent; the feedback generated message is sent by the agent to the CCC system. In this description, the term "electronic key" can encompass a secure memory card device (e.g., a "smart card").

It should be noted that several technical details are involved with generating the feedback request message and the feedback generated message. For example, the identity of the exact agent who is accessing the particular electronic lock box needs to be known, and one way to accomplish this is to include certain identification information about that agent in a "unique transaction identifier" message that is sent to the CCC, using an electronic key of one form or another. If a secure memory card 70 is being used, then the agent's identifying information can be included (and already is included in lock box systems sold by SentriLock LLC); moreover, the time/date stamp information of the access event itself can be included in the unique transaction identifier message. In a SentriLock system, all of this information is formed into an encrypted diversified numeric value that cannot be easily decrypted. Furthermore, the secure memory card (or an electronic key) includes a serial number that could be included in the encrypted diversified information, if desired; and the electronic lock box itself may contain a serial number that can be sent to the secure memory card (or to an electronic key), and that serial number could be included in the encrypted diversified information, if desired. This "unique transaction identifier" message information is transferred to the CCC at an appropriate time, when the agent presents his/her secure memory card to the CCC system to have that secure memory card renewed; or if the lock box is at a property that uses the dwelling base station (see FIG. 5), then the information can be transferred to the CCC almost immediately.

On the other hand, if a "pure" electronic key is used (something like a wireless PDA, or other Internet-capable communications device), then there would be no particular need to use a secure memory card—instead, the access event information will be sent from the electronic lock box to the electronic key, and ultimately to the CCC. Again, various types of identification information can be included in the "unique transaction identifier" message, including the agent's identifying information, the time/date stamp of the access event, and perhaps the serial number of the electronic key, if desired. The electronic key could be made so as to encrypt this information using the same type of diversification function that is presently being used on electronic lock boxes and secure memory cards sold by SentriLock LLC.

The CCC will authenticate the initial "unique transaction identifier" message, and then, assuming the message is valid, the CCC will send the feedback request message to the agent of the electronic key (which could be a secure memory card), typically via electronic mail. The agent typically receives this feedback request message by some type of Internet-capable device, and "reads" that message on his/her display screen. After the agent reads the feedback request message, he/she is able to generate a feedback response message by answering the questions that were included in the survey questionnaire that arrived as part of the feedback request message about the property that was recently visited by this showing agent. In addition, the feedback response message will typically allow the agent to add other information in a "free format" comment, if the agent so desires to include that type of comment in the feedback response message.

The above feedback request messages and feedback response messages could all occur on a wireless electronic key (e.g., the electronic key 280 on FIG. 4), if desired. If the electronic key is sufficiently sophisticated, then it can be used to: (1) communicate with the electronic lock box to access the property of the showing; (2) send the access event information in the form of the "unique transaction identifier" message to the CCC; (3) receive the feedback request message from the CCC; and finally (4) respond to that feedback request message by sending a feedback generated message (a feedback response message) back to the CCC. Most of these communications could occur by use of e-mail, although other forms of more-real time messaging could be used, if desired.

A step 612 now calculates the ratio of feedback received as compared to feedback generated. This ratio typically will be in a numeric form, and as such, the ratio can be stored in numeric form and compared to other numeric values, such as comparative threshold settings.

A decision step 620 determines if the calculated ratio value for a particular agent has fallen below a first predetermined threshold value, referred to on FIG. 9 as "THRESHOLD #A." If the answer is NO, then the logic flow is directed to a step 622, which allows the agent to continue normal activity in the CCC system. Alternatively, if the result is YES at decision step 620, then a step 624 will prevent this agent from seeing responses to his/her own feedback request in the CCC system. This is a somewhat punitive measure, attempting to persuade that particular agent to provide well-intentioned feedback, when requested after a showing has occurred that this agent participated in. If the agent's ratio rises above THRESHOLD #A, then he/she will again be granted "normal agent activity."

The logic flow is now directed to decision step 630 which determines if the calculated ratio (from step 612) has fallen below a second (lower) threshold value, referred to on FIG. 9 as "THRESHOLD #B." If the answer is NO, then the logic flow is directed back to step 610. It should be noted that this agent may not be allowed to continue "normal agent activity;" even though his or her calculated ratio was not below THRESHOLD #B, his/her calculated ratio nevertheless could have been below THRESHOLD #A, and therefore, step 622 might still be invoked.

If the result is YES at decision step 630, then a step 632 will prevent this agent from requesting feedback of other agents. Even in that event, a step 634 allows this agent to answer requests as a showing agent, but the punitive effects of both steps 624 and 632 will be in effect.

The logic flow is now directed to a step 636, where the CCC again evaluates the agent's feedback ratio and directs the logic flow back to step 610. In this manner, the agent can start to behave more professionally, and his/her ratio will begin to rise. Eventually, it may rise above THRESHOLD #B, and he/she would be allowed to again request the feedback of other showing agents. The look back time period for making the evaluation by the CCC at step 636 could be configurable by the system administrator for the association/board that controls a group of electronic lock boxes in a particular geographic area. Moreover, the initial amount of time before making the "first evaluation" at step 620 could be a different time interval than the amount of time for making the "second evaluation" at step 630, if desired by the system administrator.

The weight of feedback requests received as compared to feedback generated can be modified by the system administrator of the CCC, if desired. To start with, the weighting factor might be set to 1.0 for both feedback requests received and feedback generated as detected by the CCC. However, the administrators of the CCC system may decide that the weighting factors should be some value other than 1.0, although this also allows the weighting factors to be different values for feedback requests received as compared to feedback generated. Naturally, the threshold values (for THRESHOLD #A and THRESHOLD #B) will likely need to be adjusted if the weighting factors for the feedback numeric values are adjusted. This functionality can be provided for each CCC system, if desired.

The general concept of the routines of FIG. 8 and FIG. 9 involves "response rate" tracking by the CCC. In FIG. 9, the response rate was essentially described as a ratio of the number of responses (by a showing agent) over the number of showings (by that showing agent). If a showing agent responds each time he/she is given the opportunity, then the ratio would be 1.0, and this could be expressed (in a percentage) as 100%, which would be a perfect "percentage response rate." It then becomes a matter of system design choice by a real estate board/association to decide for itself exactly at what percentages the two thresholds should be set (for THRESHOLD #A at step 620 and for THRESHOLD #B at step 630).

Another way to track and evaluate a "response rate" is by sheer numbers of responses by a particular showing agent, over a time period. For example, if a prolific showing agent has thirty (30) showings in a single month, then the real estate board/association might decide that is a significant enough effort to not penalize this showing agent, even if the agent's "percentage response rate" was relatively lower than normally would be desired. Of course, the board/association would have to draw the line (i.e., the threshold values) somewhere high enough to ensure that even very prolific showing agents must provide their fair share of feedback responses, or the overall incentivized feedback system would not provide its primary benefit to listing agents.

Therefore, the phrase "response rate" can have multiple meanings, as used herein: the first meaning is a percentage response rate, which typically refers to the number of feedback responses compared to the number of showings performed, by a particular agent. The second meaning of "response rate" is based on the number of showings performed by a particular agent over a predetermined time interval; by using this information, the percentage response rate "penalties" could be modified for a prolific showing agent, if that is deemed a desirable trait by the board/association. Another possible meaning of "response rate" could be a weighted value, if desired, so that its value depends on more than a single characteristic. For example, the percentage response rate numeric value could be modified by a "high" (or "low") number of showings performed over a predetermined time interval, so that both of these attributes are always part of the "equation" for determining this type of performance by showing agents. Finally, there could be other attributes that a particular real estate board or association would like to use as its equivalent for a "response rate," that have not been discussed herein. The central computer system can be programmed so as to be quite flexible with regard to gathering information about agent usage and agent feedback performance.

In an embodiment of the technology disclosed herein, the feedback scoring system autonomously tracks and adjusts user "scores" based on the relative performance of a user in the system compared to other users. The tracked scores are accumulated (or composite) numeric values. Qualitative feedback (also referred to herein as a "feedback quality score") is captured for each returned survey questionnaire and scored by the user who created the survey questionnaire, on a scale of zero (0) through five (5), for example, with zero being least desirable and five being most desirable. To provide weighting, the only scores selectable in the range, for example, are 1, 3, and 5, which correspond to Poor, Average, and Excellent, respectively. A score of zero (0) is entered for non-response. As time is of the essence in responding to survey feedback, an additional one (1) point quality penalty is levied for every time period "P" that elapses from the time of survey generation to the time of feedback response. The value of P is configurable by the administrator. At no time does a score go lower than zero.

In one exemplary embodiment, the scoring system can consist of the following elements:

T—the relative time period "look back" in days. Since user behavior is inconsistent over time, the look back time period is used to account for behavior changes both positive and negative over a relatively recent stretch of history. IRR, IQM, IRM, SRD, SRM, SQD and SQM scoring is all computed over T time.

IRR—the total number of responses requested from the user.

IQM—the overall qualitative score reflecting a user's feedback quality as reported by the general population of users. IQM scores are maintained for each user in the system.

IRM—the individual mean response rate of the individual to feedback queries (feedback requests) as a percent of total inquiries received. IRM scores are also individually maintained for each user in the system.

SRD—the system standard deviation of overall response rate to all feedback requests generated as a percent of total inquiries generated by all users.

SRM—the system mean of overall response rate to all feedback requests generated as a percent of total inquiries generated by all users.

SQM—the system mean quality of responses received.

SQD—the system standard deviation of quality of all feedback created.

In this example scoring system, the system compares a user's IRM score with the system's SRM score. If IRM is not below SRM, or IRM is greater than or equal to SRM minus SRD, the user's IRM score indicates the user is a regular contributor relative to others in the system and system functionality is not limited with respect to participation rate. Next the user's IQM score is compared to the SQM metric for all scores in the system. If the user's IQM score is greater than or equal to the SQM score, or if the IQM is greater than or equal to SQM minus 1.414 times SQD, the user's feedback quality is deemed adequate. By combining the two measures above, overall performance can be measured.

Special cases can exist where a user may create many feedback requests, but not engage in activity which would subject them to receiving feedback requests from others. The system tracks total responses in IRR. If IRR is zero, the user has not been asked to respond and, therefore, no measurement can be applied.

Listing Agent Scoring Routine

Figure 10:
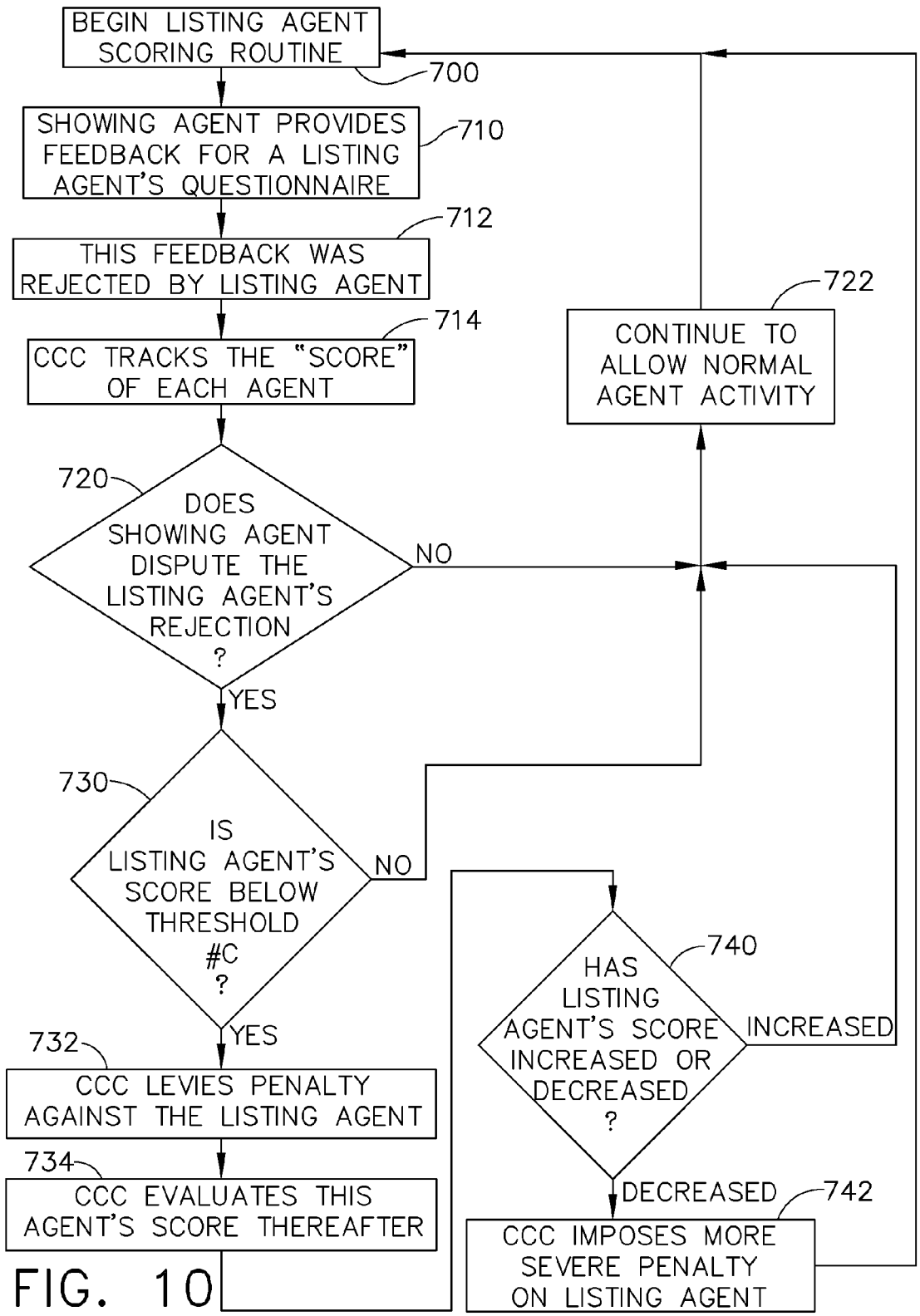
FIG. 10 is a flow chart of the steps performed by a "Listing Agent Scoring Routine," as used by the central computer station of an electronic lock box security system.

Referring now to FIG. 10, a "Listing Agent Scoring Routine" begins at a step 700. In this routine, the listing agent's performance is evaluated, whereas in the routines described in FIGS. 8 and 9, it was the showing agent's performance being evaluated. For this Listing Agent Scoring Routine of FIG. 10 to be automated, each listing agent who works in a real estate board or association must be tracked and given a numeric score that represents his/her performance when he/she evaluates feedback that has been provided by other agents in the system (i.e., the various showing agents). Note that this "listing agent score" is a separate concept from the "showing agent" types of scores discussed above.

One exemplary way to create a score for listing agents is to track the number of instances of rejected feedback and the number of instances of nominated feedback by each listing agent, and calculate a ratio or percentage of rejects versus the total number of all feedback responses that are evaluated by a listing agent. For example, if a particular listing agent has rejected nine (9) feedback responses out of one hundred (100) total received, then the percentage of rejects is 9% for that specific listing agent, and the agent's "approval score" would be 91%. This is a composite value that is accumulated over time, and it can be continuously re-examined "forever," if desired; or it could be truncated after a given time interval to keep only the most recent values for a predetermined look back time period, if desired. This preferably would be a configurable feature.

The total number of "good" and "bad" (rejected) feedback responses is also tracked, system-wide, which typically would be for an entire real estate board or association. This total amount is for all agents, and is accumulated over time. Again, this value could be re-examined "forever," or it could be truncated after a given time interval to keep only the most recent values for a predetermined look back time period, as a configurable feature.

The system-wide value for the number of rejected feedback versus the number of total feedback responses can be calculated as a ratio or a percentage. This value will be considered to be the average "score" for all of the listing agents of the board/association. Assuming some type of system-wide change is not necessary to make adjustments for artificially-induced low or high scoring values, then this average will become the "target" value that all listing agents should aspire to. Once a sufficient amount of feedback has been accumulated in the board's system, the system administrator can then determine a threshold value (sometimes referred to herein as "THRESHOLD #C") that will be used to evaluate the scoring behavior for each of the listing agents.

For example, if the system-wide average "good" feedback score is 98%, and if the value of THRESHOLD #C is 10% deviation from the average, then the numeric value of THRESHOLD #C is 88.2%. In this example, the listing agent's individual score of 91% "good feedback" is barely within tolerance and there would be no sanctions involved to penalize that agent. However, if the value of THRESHOLD #C is set to a value of only 5% deviation from the average, then the numeric value of THRESHOLD #C becomes 93.1%, and that same listing agent's individual score of 91% would then be outside the allowable range. In this situation, the listing agent will become susceptible to having a penalty imposed by the central computer (CCC). The range of penalties is up to each individual board/association, and if desired, the types of penalties can be similar to those described above with respect to the "mutual cooperation routine" of FIG. 9.

Referring back to FIG. 10, a step 710 includes a function by which the showing agent provides feedback for a listing agent's questionnaire. This portion of the Listing Agent Scoring Routine assumes that the proposed feedback has been rejected by the listing agent, which is a function that occurs at step 712. The CCC tracks the "score" of each listing agent at a step 714, in a manner as discussed above.

A decision step 720 now determines whether the showing agent has decided to dispute the listing agent's rejection of the feedback (back at step 712). If the answer is NO, then the logic flow is directed to a step 722, and the CCC's functions continue to allow normal agent activity for both agents. However, if the result is YES at decision step 720, then a decision step 730 determines if the listing agent's score is below a predetermined threshold, referred to on FIG. 10 as "THRESHOLD #C." The CCC determines this status in a manner as discussed above.

If the listing agent's score was not below THRESHOLD #C at step 730, then normal agent activity is allowed to continue at step 722. However, if the result is YES at decision step 730, then a step 732 functions such that the CCC levies a penalty against the listing agent. At a step 734, the CCC evaluates this agent's score thereafter, looking for future trends.

The logic flow is now directed to a decision step 740 which determines whether the listing agent's score has increased or decreased, as of late. If the agent's score has sufficiently increased, then the CCC can determine that is should allow normal agent activity to continue at step 722. This could be done by comparing the listing agent's score to THRESHOLD #C, or by a different method, if desired. However, if the listing agent's score has sufficiently decreased, then a step 742 functions such that the CCC imposes a more severe penalty against for this listing agent. This additional penalty might be sufficiently severe that human oversight will be deemed necessary before the penalty is actually implemented. This will be configurable by the administrators of the CCC system.

It should be noted that the decision to impose a penalty on a listing agent with a "bad" score could be made more automatic, if desired. In other words, the logic flow on FIG. 10 could be altered to bypass decision step 720, and thus always arrive at step 730 without any intervention by a disgruntled showing agent. If that type of system is used, the penalties that are levied against the listing agents perhaps could be less severe; or they could remain exactly the same, depending on decisions made by the system administrators of the CCC. Also, perhaps the setting for the threshold variation from the average score (i.e., the value for THRESHOLD #C) could be somewhat relaxed.

The look back time period for making the evaluation by the CCC at step 740 could be configurable by the system administrator for the association/board that controls a group of electronic lock boxes in a particular geographic area. Moreover, the initial amount of time before making the "first evaluation" at step 730 could be a different time interval than the amount of time for making the "second evaluation" at step 740, if desired by the system administrator. For example, the look back time to first decide that the listing agent's score deserves a penalty (at step 730) might be several months to a year, whereas the look back time for allowing the agent to again continue normal activity (at step 740) after exhibiting an increased score might be much shorter, perhaps only 30 to 60 days.

Figure 11:
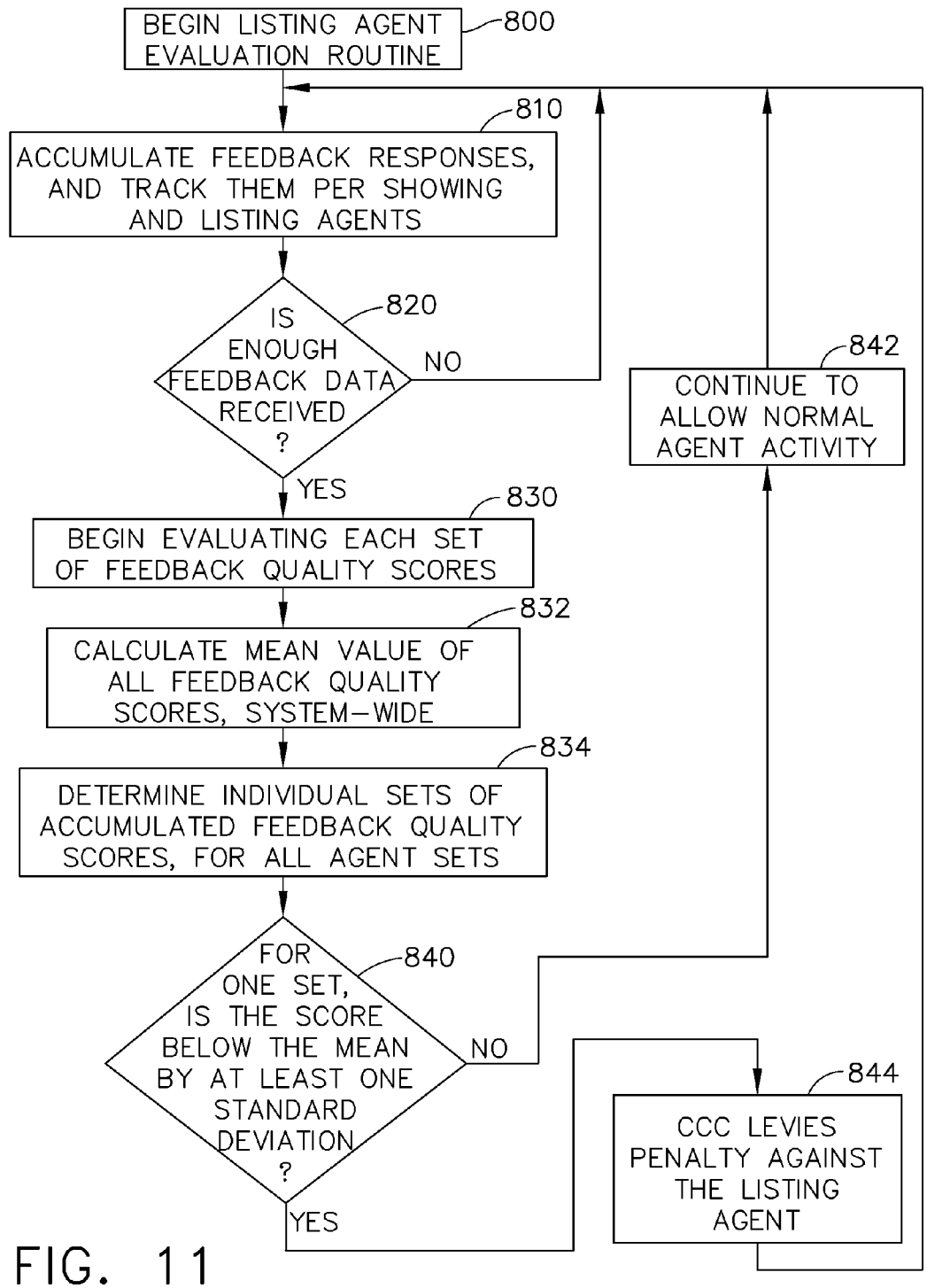
FIG. 11 is flow chart of the steps performed by a "Listing Agent Evaluation Routine," as used by the central computer station of an electronic lock box security system.

Referring now to FIG. 11, an alternative methodology for evaluating listing agents is presented, starting with a step 800 for a "Listing Agent Evaluation Routine." At a step 810, the CCC system accumulates feedback responses from all the showing agents in a Board's/Association's geographic area (or in some other way of defining a group of users for the CCC). The CCC also categorizes the feedback responses such that the CCC tracks each "set" of such responses in which a set represents one pair comprising a showing agent and a listing agent. In other words, if a showing agent #X sends multiple feedback responses for properties listed by a listing agent #Y, then all of those multiple feedback responses will be categorized in a single set ("Set #1"), and statistics will be kept for that set. If the same showing agent #X also sends one or more feedback responses for a property (or properties) listed by a listing agent #Z, then those particular feedback responses will be also categorized in a different single set ("Set #2"); but the values entered into this Set #2 have nothing to do with Set #1, except that they have a common showing agent identifier.

The CCC system eventually will have enough feedback data to be able to make statistically meaningful decisions, and a decision step 820 will make that determination. If the evaluation system is still too new, then the logic flow is directed back to step 810 to gather more data. Once sufficient data has been received at the CCC for this group of agents, then the logic flow is directed to a step 830, and the CCC begins to evaluate each of the sets of feedback quality scores that have been entered by the listing agent who is involved in each particular set. The term, "feedback quality score" can refer to any desired methodology of classifying the "quality" of feedback "grading" by listing agents, and includes the example methodology described above, in connection with the Mutual Cooperation Routine described in FIG. 9.

A step 832 then calculates the mean value of all the feedback quality scores that have been received, system-wide. This numeric mean value may or may not represent a particularly desirable trait of the scoring abilities of, or perceptions by, the various listing agents of a specific board/association of agents; however, it at least serves as a numeric value that is representative of the overall group of these agents, and it can be used for various purposes.

A step 834 determines the accumulated (or composite) feedback quality score for each of the individual sets of agents. There will be as many "sets" of these scores as there are pairs of listing agents and responding showing agents in the board/association of agents. This does not necessarily mean that every possible set of agent pairs will have a score—there will first have to be at least one feedback response from a specific showing agent for a property listing by a specific listing agent to establish each of these individual sets.

For each individual set, a decision step 840 determines if the feedback quality score determined in step 834 deviates by an amount greater than a predetermined quantity from the mean that was calculated in step 832 (such as an amount that is at least one standard deviation from that mean). If so, then the CCC will levy a penalty against the listing agent at a step 844. If not, then the logic flow is directed to a step 842, which allows normal agent activity to continue.

In the evaluation system described above, in reference to FIG. 11, the system routinely monitors the listing agent scoring of feedback to root out instances of intentionally attempting to single out an individual showing agent for negative scoring. This becomes a self-referential closed loop system of feedback checks and balances, and when coupled with a meaningful population size allows a robust automated system that encourages participation with maximum quality of responses received.

One optional variation is to calculate, at step 832, the mean value of the feedback quality scores for each individual showing agent, rather than the mean value of such scores for the entire population of agents in the board/association system. Then the comparison determination of decision step 840 will be "aimed" at a specific showing agent's accumulated feedback quality scores, so that only his/her scores will be used in the standard deviation test. In this manner, a listing agent's scoring of that showing agent is compared to only that showing agent's feedback quality scores that have been received from the general population of users. As such, this is a refinement that will more closely determine if an individual listing agent is intentionally attempting to single out that specific showing agent for negative scoring. If the listing agent's scoring of that showing agent deviates by an amount greater than a predetermined quantity from the mean received by the general population for that showing agent (such as an amount that is at least one standard deviation from that mean), then the listing agent will be penalized at step 844.

It will be understood that the threshold value discussed above, a "standard deviation" from the mean, is merely an example of one possible penalty determination technique that could be used in this system. Other types of thresholds could instead be used, such as a percentage tolerance, or some other type of statistical value.

It is important to note that the scoring systems described above are flexible, and can be modified to meet local business and information needs of a particular association of real estate agents. It is expected that a system as described herein will require some "tuning," to address the unique requirements of each group of participants.

Some additional information about "basic" lock box embodiments, including advanced features, are more fully described in earlier patent documents by the same inventor, and assigned to SentriLock, Inc. or SentriLock LLC, including: U.S. Pat. No. 7,009,489, issued Mar. 7, 2006, for ELECTRONIC LOCK SYSTEM AND METHOD FOR ITS USE; U.S. Pat. No. 6,989,732, issued Jan. 24, 2006, for ELECTRONIC LOCK SYSTEM AND METHOD FOR ITS USE WITH CARD ONLY MODE; U.S. Pat. No. 7,086,258, issued Aug. 8, 2006, for ELECTRONIC LOCK BOX WITH SINGLE LINEAR ACTUATOR OPERATING TWO DIFFERENT LATCHING MECHANISMS; U.S. Pat. No. 7,420,456, issued Sep. 2, 2008, for ELECTRONIC LOCK BOX WITH MULTIPLE MODES AND SECURITY STATES; U.S. Pat. No. 7,193,503, issued Mar. 20, 2007, for ELECTRONIC LOCK SYSTEM AND METHOD FOR ITS USE WITH A SECURE MEMORY CARD; U.S. patent application Ser. No. 11/584,940, filed on Oct. 23, 2006 (Publication No. US 2007/0090921), for ELECTRONIC LOCK BOX WITH KEY PRESENCE SENSING; U.S. patent application Ser. No. 11/585,038, filed on Oct. 23, 2006 (Publication No. US 2007/0096870), for ELECTRONIC LOCK BOX USING A BIOMETRIC IDENTIFICATION DEVICE; U.S. patent application Ser. No. 11/954,695, filed on Dec. 12, 2007 (Publication No. US 2008/0246587), for ELECTRONIC LOCK BOX WITH TRANSPONDER BASED COMMUNICATIONS; U.S. patent application Ser. No. 12/199,081, filed on Aug. 27, 2008 (Publication No. 2008/0309458), for ELECTRONIC LOCK BOX WITH TIME-RELATED DATA ENCRYPTION BASED ON USER-SELECTED PIN; and U.S. patent application Ser. No. 12/128,038, filed on May 28, 2008 (Publication No. US 2009/0293562), for ELECTRONIC LOCK BOX WITH MECHANISM IMMOBILIZER FEATURES. These patent documents are incorporated by reference herein, in their entirety.

It will be understood that the logical operations described in relation to the flow charts of FIGS. 6-11 can be implemented using sequential logic (such as by using microprocessor technology), or using a logic state machine, or perhaps by discrete logic; it even could be implemented using parallel processors. One preferred embodiment may use a microprocessor or microcontroller (e.g., element 16 on FIG. 3) to execute software instructions that are stored in memory cells within an ASIC. In fact, the entire microprocessor (or microcontroller), along with RAM and executable ROM, could be contained within a single ASIC, in one mode of the technology disclosed herein. Of course, other types of circuitry could be used to implement these logical operations depicted in the drawings without departing from the principles of the technology disclosed herein. In any event, some type of processing circuit will be provided, whether it is based on a microprocessor, a logic state machine, by using discrete logic elements to accomplish these tasks, or perhaps by a type of computation device not yet invented; moreover, some type of memory circuit will be provided, whether it is based on typical RAM chips, EEROM chips (including Flash memory), by using discrete logic elements to store data and other operating information (such as the event log access data stored, for example, in memory element 23), or perhaps by a type of memory device not yet invented.

It will also be understood that the precise logical operations depicted in the flow charts of FIGS. 6-11, and discussed above, could be somewhat modified to perform similar, although not exact, functions without departing from the principles of the technology disclosed herein. The exact nature of some of the decision steps and other commands in these flow charts are directed toward specific future models of lock box systems (those involving SentriLock LLC, for example) and certainly similar, but somewhat different, steps would be taken for use with other models or brands of lock box systems in many instances, with the overall inventive results being the same.

To restate some of the features of the technology disclosed herein, an electronic lock box system is provided in which a targeted set of questions can be posed by the listing agent to a showing agent at some time after the showing. An improvement in the system is the ability for the listing agent to be able to offer an incentive to respondents. This incentive optionally could be pooled and subsequently divided at a later time among all respondents, or it could be a per-response based type of incentive. Yet another feature of the system is a scoring system which tracks each participant's response rate, and if a particular participant's response rate to queries received from others falls below a configurable threshold value, that participant can no longer generate queries or receive responses. A further improvement is a system in which the set of questions for each property could be customized, or could simply use a set of default questions provided by the system. Another optional advantage of the system is to generate a query based on confirmation of the showing, through the recording procedures that occur on the electronic lock box. Yet another optional feature is to retain all query responses and allow a report to be generated automatically to the listing agent and/or to the home seller, upon a response by the showing agent. An additional advantage of the system is to allow the listing agent to review the received responses and approve (in the case of useful feedback), or reject (in the case of a bad response) the participation in the incentive by that particular respondent.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. An incentivized feedback method for operating an electronic lock box system, said method comprising:
   (a) providing: (i) a central computer system, having a database that contains information about a plurality of properties, (ii) a plurality of electronic lock boxes associated with said plurality of properties, which are placed at locations physically remote from said central computer system, and (iii) a plurality of user-controlled electronic keys;
   (b) at one of said plurality of properties, commencing an interaction between one of the plurality of electronic lock boxes and said one of the plurality of user-controlled electronic keys, by:
      (i) using a first communications circuit of one of the plurality of electronic lock boxes and a second communications circuit of one of the plurality of user-controlled electronic keys, communicating at least one message between said one of the plurality of electronic lock boxes and said one of the plurality of user-controlled electronic keys;
      (ii) by use of a second processing circuit of said one of the plurality of user-controlled electronic keys, as part of said at least one message, providing identification data to said one of the plurality of electronic lock boxes, including data pertaining to said user of said one of the plurality of user-controlled electronic keys;
      (iii) by use of said first processing circuit, analyzing said at least one message to determine an authorization of said user who is operating said one of the plurality of user-controlled electronic keys and, after determining that said user is authorized to perform at least one function involving said one of the plurality of electronic lock boxes, establishing a level of permitted functions for said authorized user;
      (iv) by use of said first processing circuit, after determining that said user is not authorized to perform at least one function involving said one of the plurality of electronic lock boxes, then denying any requested lock box function by that user; and
      (v) based upon said interaction between said one of the plurality of electronic lock boxes and said one of the plurality of user-controlled electronic keys, generating a unique transaction identifier and sending said unique transaction identifier to said central computer system;
   (c) based upon receipt of said unique transaction identifier at said central computer system, sending an information request message to said authorized user of said one of the plurality of user-controlled electronic keys;
   (d) based upon receipt of said information request by said authorized user, sending a feedback response message to said central computer system, and storing in said database said feedback response message;
   (e) based upon a plurality of said stored feedback response messages that were sent by said authorized user, determining a response rate score involving interactions by said authorized user with said central computer system, according to a performance criterion of said authorized user as determined by said central computer system, and storing in said database said response rate score; and
   (f) determining that said response rate score is considered poor according to at least one predetermined threshold value stored in said central computer system, then preventing said authorized user from obtaining access to feedback response results submitted by other users for one of said plurality of properties based on feedback responses to said authorized user's own feedback requests, but allowing said authorized user to continue using other predetermined functionality of said electronic lock box system, including obtaining access to said central computer system.

2. The method of claim 1, wherein said unique transaction identifier is an encrypted value that is based upon at least one of the following:
   (a) a time stamp when said interaction occurred between said one of the plurality of electronic lock boxes and said one of the plurality of user-controlled electronic keys;
   (b) a personal identification number associated with said authorized user;
   (c) an identification value associated with said one of the plurality of user-controlled electronic keys;
   (d) an identification value associated with said one of the plurality of electronic lock boxes; and (e) a date stamp when said interaction occurred between said one of the plurality of electronic lock boxes and said one of the plurality of user-controlled electronic keys.

3. The method of claim 1, further comprising a step of: curtailing predetermined functionality for at least one of: (a) said central computer system, and (b) said electronic lock box access.

4. The method of claim 1, further comprising the step of: allowing said authorized user, as a showing agent, to answer requests from said other users.

5. The method of claim 4, further comprising the steps of: (a) allowing said response rate score to improve as said authorized user continues to answer requests from said other users, and (b) if said response rate score later exceeds said at least one predetermined threshold value, then (c) reinstating said authorized user's functionality for obtaining access to said feedback response results submitted by said other users.

6. An incentivized feedback method for operating an electronic lock box system, said method comprising:
   (a) providing: (i) a central computer system, having a database that contains information about a plurality of properties, (ii) a plurality of electronic lock boxes associated with said plurality of properties, which are placed at locations physically remote from said central computer system, and (iii) a plurality of user-controlled electronic keys;
   (b) at one of said plurality of properties, commencing an interaction between one of the plurality of electronic lock boxes and said one of the plurality of user-controlled electronic keys, by:
      (i) using a first communications circuit of one of the plurality of electronic lock boxes and a second communications circuit of one of the plurality of user-controlled electronic keys, communicating at least one message between said one of the plurality of electronic lock boxes and said one of the plurality of user-controlled electronic keys;
      (ii) by use of a second processing circuit of said one of the plurality of user-controlled electronic keys, as part of said at least one message, providing identification data to said one of the plurality of electronic lock boxes, including data pertaining to said user of said one of the plurality of user-controlled electronic keys;
      (iii) by use of said first processing circuit, analyzing said at least one message to determine an authorization of said user who is operating said one of the plurality of user-controlled electronic keys and, after determining that said user is authorized to perform at least one function involving said one of the plurality of electronic lock boxes, establishing a level of permitted functions for said authorized user;
      (iv) by use of said first processing circuit, after determining that said user is not authorized to perform at least one function involving said one of the plurality of electronic lock boxes, then denying any requested lock box function by that user; and
      (v) based upon said interaction between said one of the plurality of electronic lock boxes and said one of the plurality of user-controlled electronic keys, generating a unique transaction identifier and sending said unique transaction identifier to said central computer system;
   (c) based upon receipt of said unique transaction identifier at said central computer system, sending an information request message to said authorized user of said one of the plurality of user-controlled electronic keys;
   (d) based upon receipt of said information request by said authorized user, sending a feedback response message to said central computer system, and storing in said database said feedback response message;
   (e) based upon a plurality of said stored feedback response messages that were sent by said authorized user, determining a response rate score involving interactions by said authorized user with said central computer system, according to a performance criterion of said authorized user as determined by said central computer system, and storing in said database said response rate score; and
   (f) determining that said response rate score is considered poor according to at least one predetermined threshold value stored in said central computer system, then preventing said authorized user from entering a feedback request into said central computer system, such that any such feedback request will not reach any of said other users, but allowing said authorized user to continue using other predetermined functionality of said electronic lock box system, including obtaining access to said central computer system.

7. The method of claim 6, wherein said step of determining a response rate score of said stored feedback response messages comprises the step of: calculating a percentage of said stored feedback response messages sent by said authorized user to said central computer system, compared to said total number of feedback response message opportunities concerning said authorized user.

8. The method of claim 6, wherein said unique transaction identifier is an encrypted value that is based upon at least one of the following:
   (a) a time stamp when said interaction occurred between said one of the plurality of electronic lock boxes and said one of the plurality of user-controlled electronic keys;
   (b) a personal identification number associated with said authorized user;
   (c) an identification value associated with said one of the plurality of user-controlled electronic keys;
   (d) an identification value associated with said one of the plurality of electronic lock boxes; and
   (e) a date stamp when said interaction occurred between said one of the plurality of electronic lock boxes and said one of the plurality of user-controlled electronic keys.

9. The method of claim 6, further comprising a step of: curtailing predetermined functionality for at least one of: (a) said central computer system, and (b) said electronic lock box access.

10. The method of claim 6, further comprising the step of: allowing said authorized user, as a showing agent, to answer requests from said other users.

11. The method of claim 10, further comprising the steps of: (a) allowing said response rate score to improve as said authorized user continues to answer requests from said other users, and (b) if said response rate score later exceeds said at least one predetermined threshold value, then (c) reinstating said authorized user's functionality for requesting feedback from said other users.

12. An incentivized feedback method for operating an electronic lock box system, said method comprising:
   (a) providing: (i) a central computer system, having a database that contains information about a plurality of properties, (ii) a plurality of electronic lock boxes associated with said plurality of properties, which are placed at locations physically remote from said central computer system, and (iii) a plurality of user-controlled electronic keys;

(b) at one of said plurality of properties, commencing an interaction between one of the plurality of electronic lock boxes and said one of the plurality of user-controlled electronic keys, by:
  (i) using a first communications circuit of one of the plurality of electronic lock boxes and a second communications circuit of one of the plurality of user-controlled electronic keys, communicating at least one message between said one of the plurality of electronic lock boxes and said one of the plurality of user-controlled electronic keys;
  (ii) by use of a second processing circuit of said one of the plurality of user-controlled electronic keys, as part of said at least one message, providing identification data to said one of the plurality of electronic lock boxes, including data pertaining to said user of said one of the plurality of user-controlled electronic keys;
  (iii) by use of said first processing circuit, analyzing said at least one message to determine an authorization of said user who is operating said one of the plurality of user-controlled electronic keys and, after determining that said user is authorized to perform at least one function involving said one of the plurality of electronic lock boxes, establishing a level of permitted functions for said authorized user;
  (iv) by use of said first processing circuit, after determining that said user is not authorized to perform at least one function involving said one of the plurality of electronic lock boxes, then denying any requested lock box function by that user; and
  (v) based upon said interaction between said one of the plurality of electronic lock boxes and said one of the plurality of user-controlled electronic keys, generating a unique transaction identifier and sending said unique transaction identifier to said central computer system;
(c) based upon receipt of said unique transaction identifier at said central computer system, sending an information request message to said authorized user of said one of the plurality of user-controlled electronic keys;
(d) based upon receipt of said information request by said authorized user, sending a feedback response message to said central computer system, and storing in said database said feedback response message;
(e) limiting an operational time interval to a predetermined renewal period for allowing said one of the plurality of user-controlled electronic keys to perform predetermined functions with said plurality of electronic lock boxes, and during said predetermined renewal period, said authorized user must contact said central computer system and perform a renewal function to create a new operational time interval within said predetermined renewal period, or else said one of the plurality of user-controlled electronic keys will cease to perform said predetermined functions with said plurality of electronic lock boxes;
(f) based upon a plurality of said stored feedback response messages that were sent by said authorized user, determining a response rate score involving interactions by said authorized user with said central computer system, according to a performance criterion of said authorized user as determined by said central computer system, and storing in said database said response rate score; and
(g) determining that said response rate score is considered poor according to at least one predetermined threshold value stored in said central computer system, then shortening said renewal period for allowing said one of the plurality of user-controlled electronic keys to remain operable for performing said predetermined functions with said plurality of electronic lock boxes, but otherwise allowing said authorized user to obtain access to said central computer system.

13. The method of claim 12, wherein said unique transaction identifier is an encrypted value that is based upon at least one of the following:
  (a) a time stamp when said interaction occurred between said one of the plurality of electronic lock boxes and said one of the plurality of user-controlled electronic keys;
  (b) a personal identification number associated with said authorized user;
  (c) an identification value associated with said one of the plurality of user-controlled electronic keys;
  (d) an identification value associated with said one of the plurality of electronic lock boxes; and
  (e) a date stamp when said interaction occurred between said one of the plurality of electronic lock boxes and said one of the plurality of user-controlled electronic keys.

14. The method of claim 12, further comprising a step of: curtailing predetermined functionality for at least one of: (a) said central computer system, and (b) said electronic lock box access.

15. The method of claim 12, further comprising the step of: allowing said authorized user, as a showing agent, to answer requests from said other users.

16. The method of claim 15, further comprising the steps of: (a) allowing said response rate score to improve as said authorized user continues to answer requests from said other users, and (b) if said response rate score later exceeds said at least one predetermined threshold value, then (c) lengthening said renewal period to its original value.

* * * * *